United States Patent
Sun et al.

(10) Patent No.: US 12,455,327 B2
(45) Date of Patent: Oct. 28, 2025

(54) TRANSFER LEARNING-BASED POWER TRANSFORMER PARTIAL DISCHARGE DIAGNOSIS

(71) Applicant: Mitsubishi Electric Research Laboratories, Inc., Cambridge, MA (US)

(72) Inventors: Hongbo Sun, Lexington, MA (US); Kyeong Jin Kim, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 163 days.

(21) Appl. No.: 18/527,754

(22) Filed: Dec. 4, 2023

(65) Prior Publication Data

US 2025/0180666 A1 Jun. 5, 2025

(51) Int. Cl.
*G01R 31/62* (2020.01)
*G01R 31/08* (2020.01)
*G06F 18/213* (2023.01)
*G06F 18/24* (2023.01)
(Continued)

(52) U.S. Cl.
CPC .......... *G01R 31/62* (2020.01); *G01R 31/086* (2013.01); *G06F 18/213* (2023.01); *G06F 18/24* (2023.01); *H02J 3/0012* (2020.01); *H02J 3/388* (2020.01); *H02J 2203/10* (2020.01); *H02J 2203/20* (2020.01)

(58) Field of Classification Search
None
See application file for complete search history.

(56) References Cited

U.S. PATENT DOCUMENTS 9,769,371 B1 * 9/2017 Azuma ................ H04N 23/672

OTHER PUBLICATIONS

L. Duan, J. Hu, G. Zhao, K. Chen, J. He and S. X. Wang, "Identification of Partial Discharge Defects Based on Deep Learning Method," in IEEE Transactions on Power Delivery, vol. 34, No. 4, pp. 1557-1568, Aug. 2019, doi: 10.1109/TPWRD.2019.2910583.
(Continued)

*Primary Examiner* — Farhana A Hoque
(74) *Attorney, Agent, or Firm* — Gene Vinokur

(57) ABSTRACT

A diagnosis system is provided for diagnosing the partial discharge faults in a power transformer. The system includes a feature extractor, a fault classifier and a domain discriminator and whose parameters are optimized by minimizing a combination of feature loss, classifier loss and domain discrepancy discriminator loss. The feature loss is a weighted sum of cosine similarity distance loss, batch-based instance separation loss, and batch-based feature decorrelation loss. The measured applied voltages and partial discharge voltages are pre-processing using sliding window method to represent the each partial discharge event as a series of statistics based moments for a set of overlapped time blocks within the duration of fault event, wherein statistics based moments include an average value of applied voltage for representing the applied voltage magnitude and fault event occurring moment for each time block, and the mean, standard deviation, Kurtosis, and Skewness of partial discharge voltages for representing the variations of partial discharging within each time block.

21 Claims, 24 Drawing Sheets

(51) Int. Cl.
*H02J 3/00* (2006.01)
*H02J 3/38* (2006.01)

(56) References Cited

OTHER PUBLICATIONS

Gaoyang Li, Mingzhe Rong, Xiaohua Wang, Xi Li and Yunjia Li, "Partial discharge patterns recognition with deep Convolutional Neural Networks," 2016 International Conference on Condition Monitoring and Diagnosis (CMD), Xi'an, China, 2016, pp. 324-327, doi: 10.1109/CMD.2016.7757816.
K. Ibrahim, R. M. Sharkawy, M. M. A. Salama and R. Bartnikas, "Realization of partial discharge signals in transformer oils utilizing advanced computational techniques," in IEEE Transactions on Dielectrics and Electrical Insulation, vol. 19, No. 6, pp. 1971-1981, Dec. 2012, doi: 10.1109/TDEI.2012.6396955.

\* cited by examiner

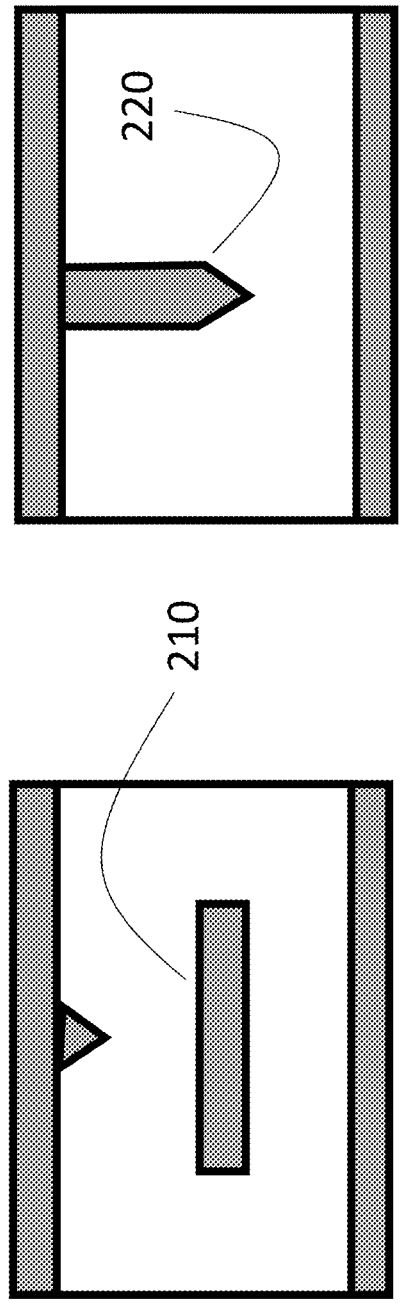
FIG. 2A
FIG. 2B
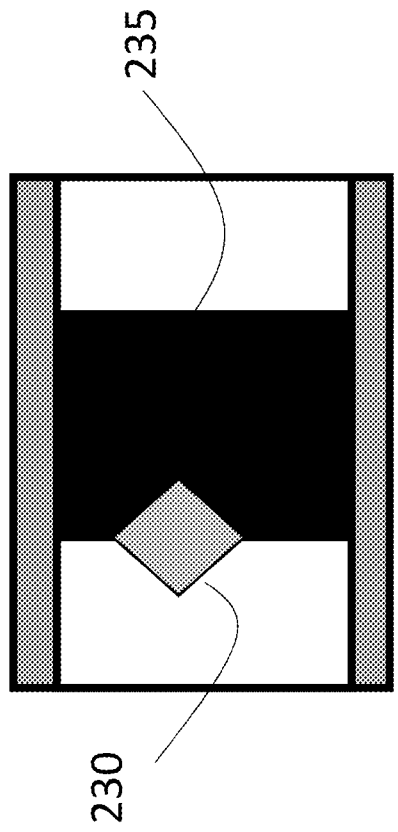
FIG. 2C

TRANSFER LEARNING-BASED POWER TRANSFORMER PARTIAL DISCHARGE DIAGNOSIS

TECHNICAL FIELD

This invention relates generally to fault diagnosis of power transformers, and more particularly to transfer learning based partial discharge diagnosis of power transformers.

BACKGROUND

The power transformers are the utmost fundamental part of power systems. The stability and reliability of power systems are heavily depended on the health of power transformers. Any failure may result in high capital loss with disruption of power supply. The power transformers are exposed to different stress conditions in the form of electrical, mechanical, environmental, and thermal stress. These stresses are potential sources for different internal and external faults in the power transformer. The predictive maintenance of transformers is believed to be most effective ways to prevent possible failures of transformers and resulted power supply disruption to societies.

FIG. 1A shows the exemplar configuration of oil-filled transformer, according to embodiments of the present invention. The transformer includes an oil tank 160 filled with mineral oil 150, an iron shell/core 140, a set of primary windings 120 connected with primary bushings 180, and a set of secondary windings 130 connected with secondary bushings 190. The insulation 110 is used to avoid direct contact between windings and iron core/shell. The transformer is also installed with cooling tubes 170 to manage temperatures within the oil tank.

FIG. 1B shows a schematic of a power distribution system 105 (i.e. power distribution network) with power transformers 115 that operated by a power grid control system 185. The power distribution system is connected with an upstream transmission system (not shown) through a substation bus 175, and two downstream feeders. Each feeder includes a transformer to convert powers from higher voltage level at the substation bus to the lower voltage level of loads 155 located at corresponding buses 177 and deliver powers to load customers through multiple line segments 145. Each transformer is connected with two circuit breakers/switches 135. Closing both breakers/switches, the transformer is energized and connected for service. Opening both breakers/switches, the transformer is isolated and disconnected the service. Each transformer 115 is equipped with a partial discharge detector/sensor 125 which collecting discharge charge data from the sensors installed within or at the transformer. If a partial discharge is found and the discharge is severe enough for transformer maintenance or replacement, the transformer will be deenergized and disconnected of service. The power distribution system will be re-configured to avoid power outages due to transformer disconnecting service by closing the tie switch 165 between two feeders. The partial discharge detector 125 monitors the power transformer 115 partial discharge status, and sent alarm signal if discharge charge is verified to the power grid control system 185. The power grid control system will send signals to close tie switch 165 and open switches of the ill-condition transformer, and sent the transformer for further processing. The switches/breakers may have two-way communications 196 with the power grid control system 185 to receive the control signals from the power grid control systems, and send the switching statues back to the power grid control system. The PD sensors may have one-way communications 195 with the transformers to receive measurements from the transformers.

The most common failures in the transformer are due to partial discharge (PD) which occurs when one part of the insulation cannot withstand the applied electric stress causing flashovers. Different approaches have been proposed to monitor, detect, and diagnose the partial discharge in power transformers. Generally, those approaches can be classified into model-based approaches, and data-driven approaches. The model-based approaches try to build mathematical functions to fit and predict the degradation progressions of transformers. However, it is a challenging task to build models with reasonable complexity, since the mechanical principles and degradation mechanisms of transformers are relatively complex or even vague. The data-driven methods provide a simple way without prior and theoretical knowledge by making full use of large volumes of historical data to attempt to infer PD fault modes of transformers. However, the prediction accuracy of data-driven methods asks for a high quantity and quality of training data, which is a big challenge for real applications.

In recent years, model-free or data-driven machine learning (ML) techniques that do not require knowing the parametric model have led to improvements in a wide range of applications. In particular, the ability of ML techniques to learn complex hidden models from data has proven quite successful, quickly surpassing most state-of-the-art human-designed algorithms. One example of such research can be found in the paper written by Duan, J. Hu, G. Zhao, K. Chen, J. He and S. X. Wang, titled as "Identification of Partial Discharge Defects Based on Deep Learning Method," published in IEEE Transactions on Power Delivery, vol. 34, no. 4, pp. 1557-1568. In the paper, L. Duan has proposed to identify PD defects with deep learning (DL) method according to the PD current waveforms. Two basic parts of this DL framework are sparse autoencoder layer and softmax layer, the former extracting features of the input signal and the latter operating as the classifier.

Another example can be found in the paper written by Gaoyang Li, Mingzhe Rong, Xiaohua Wang, Xi Li and Yunjia Li, titled as "Partial discharge patterns recognition with deep Convolutional Neural Networks," 2016 International Conference on Condition Monitoring and Diagnosis (CMD), Xi'an, China, 2016, pp. 324-327. G. Li and others proposed a convolutional Neural network (CNN) architecture for UHF signal PD pattern source recognition. The input to CNN is generated by Short Time Fourier Transform (STFT). The first three hidden layers comprise filters, pooling layers, and dropout layers. The final two hidden layers are fully connected with 500 hidden units each, and the output layer is a fully connected linear layer.

Yet another example can be found in the paper written by K. Ibrahim, R. M. Sharkawy, M. M. A. Salama and R. Bartnikas, titled as "Realization of partial discharge signals in transformer oils utilizing advanced computational techniques," in IEEE Transactions on Dielectrics and Electrical Insulation, vol. 19, no. 6, pp. 1971-1981, where K. Ibrahim and others performed the classification of PD pattern based on SVM for the floating metallic particles in the transformer oil.

Those works have provided useful tools for partial discharge pattern (i.e. fault type) classification of transformers. However, those machine learning-based approaches have a number of challenges including one or a combination of (1) lack of training data; (2) unclearness in data representation;

and (3) the need for adjusting an architecture of a neural network for different transformers.

Therefore, there is a need for developing more advanced system for diagnosis of partial discharges of power transformers with better generalization capability.

SUMMARY OF THE INVENTION

Some embodiments of the present invention provide a transfer learning-based method for diagnosing power transformer partial discharge faults, in which a partial discharge pattern classification model is trained using fault signals and fault labels collected from a first transformer, then used for determining types of fault events for a second transformer with only fault signals but fault labels available. The measured fault signals for the transformers including applied voltages and partial discharge voltages are first denoised using discrete wavelet transform technique, and then multiple moments of statistical distribution for the transformers are generated using sliding window algorithm to represent the features of partial discharges using less volume data but without losing original time characteristics of transformers. The partial discharge pattern classification model comprises of a feature extractor, a PD fault type classifier and a PD domain discrepancy discriminator. The domain discrepancy discriminator is used for adapting existing supervised training model on new label dataset. The PD feature and fault discrepancy discrimination is also implemented through adding feature loss/cost and classification loss/cost for non-defined fault types into the parameter optimization process for the feature extractor and fault type classifier. The parameters of the partial discharge pattern classification model are optimized using a weighted sum of a classifier loss defined using a cross-entropy loss function for first transformer fault events, and a binary cross-entropy function for second transformer fault events, a domain adaptation loss defined using a binary cross-entropy function with logits loss, and a feature discrepancy loss. The feature loss is integrated jointly considering distinction between fault patterns for the particular power transformer, and domain shift being exist among power transformers, including cosine similarity, batch-based instance separation, and batch-based feature decorrelation.

It is an object of some embodiments to provide a pattern classification method to perform a partial discharge diagnosis of transformers using a machine learning (ML) technique. However, machine learning-based pattern classification requires labeled data for training. The creation of a large amount of labeled data would require extensive and time-consuming efforts and might be subject to experimentation and labeling errors. Specifically, considering the variability of actual data due to environments, dynamics, and operation constraints on the transformer providing labeled data for all classification scenarios is impractical.

Some embodiments are based on a recognition that while the availability of labeled partial discharge for an actual classification in a target domain is unavailable or at least limited, the labeled partial discharge data in other domains may be available. As used herein, a domain governed by at least a transformer with respect to another transformer that provides a labeled partial discharge is referred herein as a transformer in the target domain. The partial discharge data collected within the target domain has a target distribution of partial discharge signals governed, for example, by floating electrode, metal protrusion, metal particles on surface of insulator, metal protrusion into insulator surface, and surface discharge. The other domains that have different partial discharge distributions are referred to herein as the source domain. The labeled partial discharge data used for machine learning can come from different types of the source domains, caused by floating electrode, metal protrusion, metal particles on surface of insulator, metal protrusion into surface of insulator, and surface discharge.

Some embodiments are based on a recognition that the labeled partial discharge data for the transformer can be used by machine learning to learn a hidden model of the transformer. However, labeled partial discharge data might not be an accurate representation of partial discharge data specific to a different transformer. This can be especially true for the transformer applications training a model in a source domain and applying it to perform predictions in a target domain.

Some embodiments are based on the realization that considering the relative simplicity of partial discharge data and the inherent variability of real data, reducing the perceptible difference between data in the two domains can improve the trained model's ability to generalize. To that end, it is an object of some embodiments to use domain adaptation for partial discharge classification for transformer applications. The principal objective of DA is to minimize the distance between the distributions of the labeled data in the source domain and unlabeled data in the target domain.

Some embodiments disclose a transfer learning-based method for diagnosing power transformer insulation defects by utilizing partial discharge signals. Due to the difficulties for obtaining data during actual operation from transformers, the machine learning based diagnostic model is built based on laboratory data. By utilizing transfer learning, the built model can be applied to actual products with just a small amount of additional data, greatly improving the efficiency of high-voltage transformer maintenance.

Some embodiments provide a system for detecting partial discharge (PD) faults of power transformers in a power distribution network comprising: a PD signal collection circuit configured to acquire sensor signals measured by sensors arranged in target power transformers, wherein the sensor signals include address data indicative of locations of the transformers; an input/output (I/O) interface configured to receive the sensor signals from the signal collection circuit; a memory to store computer-implemented programs including a PD feature extractor (program), a PD fault type classifier (program), a PD domain discrepancy discriminator (program), and a power transformer isolation and maintenance procedure; and a processor configured to perform instructions of the computer-implemented programs using the sensor signals, wherein steps of the instructions comprise: extracting, for each of the target power transformers, signal features from the sensor signals by using the PD feature extractor; identify, if the extracted signal features corresponding to an online transformer among the target power transformers indicate a fault type of the online transformer by using the PD fault classifier trained along with the PD feature extractor and the PD domain discrepancy discriminator to determine PD fault types of the online transformer; generating and transmitting a power transformer isolation signal, if the sensor signal of the online transformer is greater than a defective threshold and a fault type is identified, to a set of switches relevant to the online transformer to disconnect the online transformer from service, wherein the relevant switches include switches to isolate the online transformer and re-route power supply of customers connected to the online transformer. Wherein the transmitting, the transformer isolation and maintenance procedure is performed based on the address data of the sensor signals of the online transformer.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 2A, 2B, 2C, 2D and 2E show five different typical PD defects occurring in this type of transformers, according to embodiments of the present invention;

DETAILED DESCRIPTION OF THE PREFERRED EMBODIMENTS

Figure 1A:
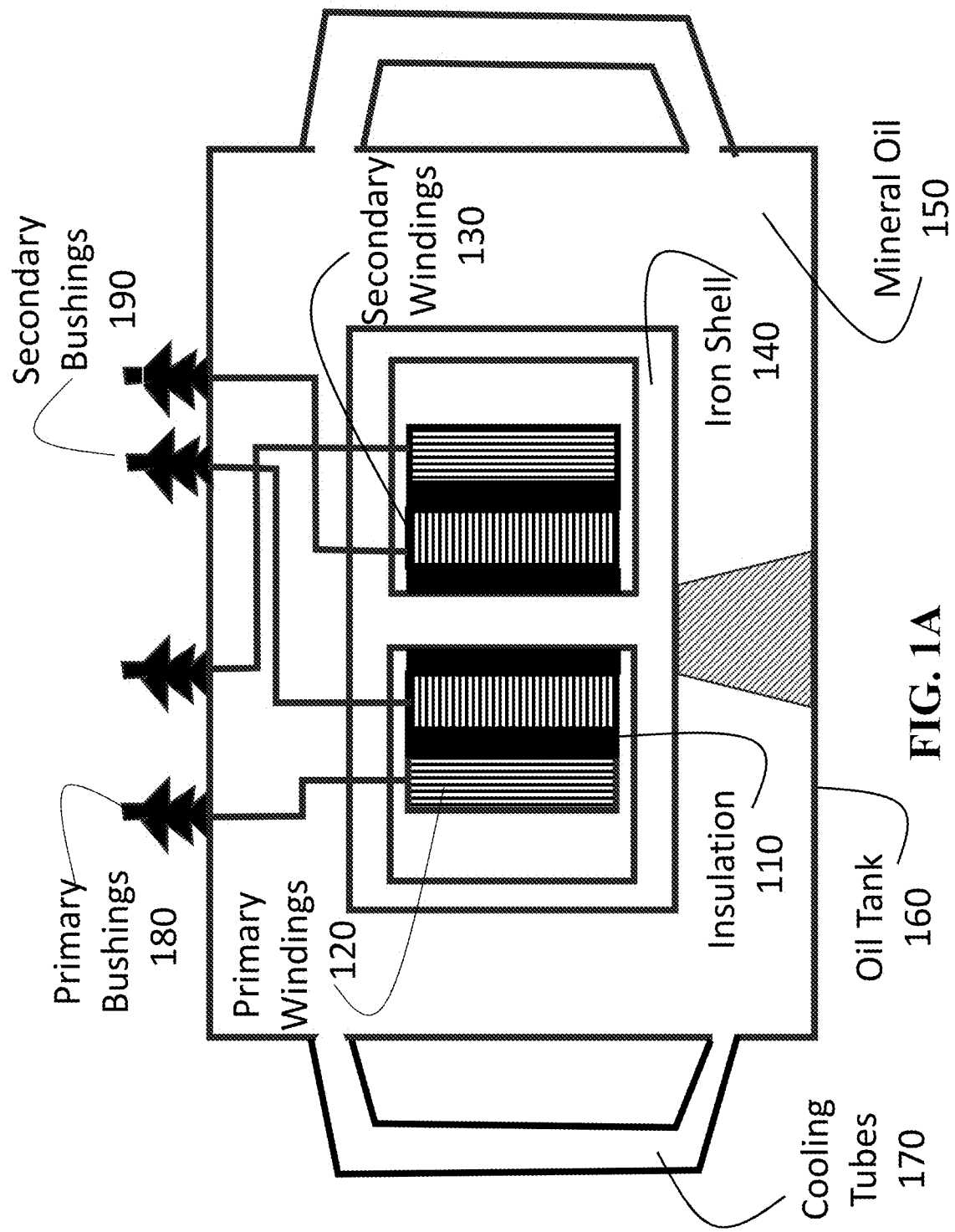
FIG. 1A shows the exemplar configuration of oil-filled transformer, according to embodiments of the present invention.
Figure 1B:
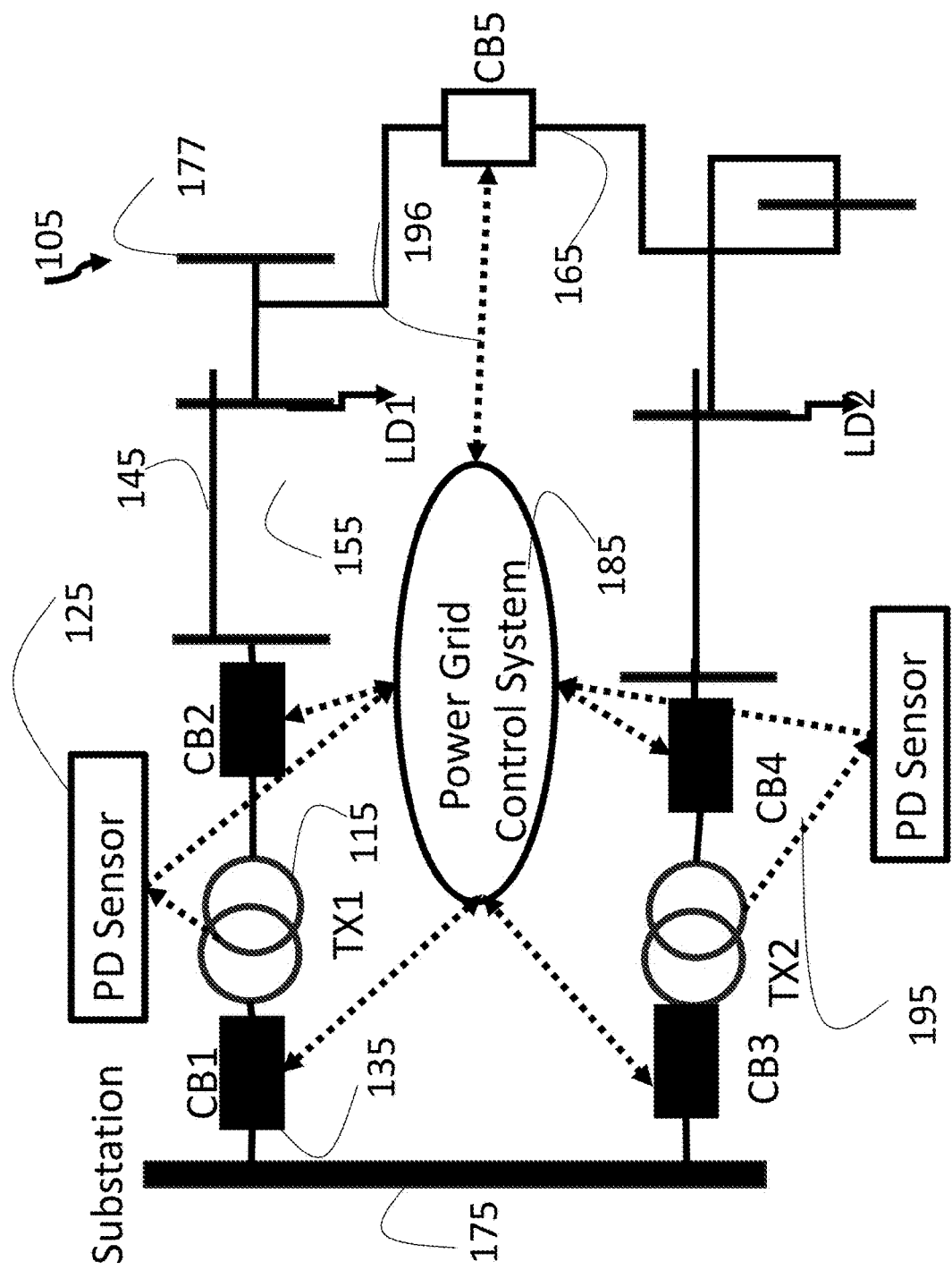
FIG. 1B shows a schematic of a transformer in a power distribution system and the relationship between transformer partial discharge detection and power grid control, according to embodiments of the present invention.

The present invention relates generally to transformers arranged in power distribution systems.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Partial Discharge (PD) diagnostic become more important for high voltage (HV) equipment condition monitoring. PD phenomenon in power transformer could indicate insulation aging or degradation, which in long term could reduce the integrity of the insulation and leading to transformer failure. High accuracy of recognition rate for different PD defect is necessary for a successful PD diagnostic. The objective of this disclosure is presenting a technique for predictive maintenance of transformer through partial discharge pattern classification of transformers. The disclosed technique can improve the generalization capability for identifying transformer fault types by using machine learning techniques, including domain adaptation or transfer learning technique.

Diagnosis of power transformers is a powerful tool to classify various faults. The main purpose of PD diagnosis is to identify the cause of PD in the insulation and distinguish the type of defects. Since power transformers have a highly complex insulation system with almost inaccessible inner components, PD diagnosis is demanding and challenging.

The conventional machine learning based methods require large amounts of correctly labeled training data, which is problematic in the context of transformer PD diagnosis, as the data are nontrivial to annotate. However, there exist laboratory insulation equipment that can generate large amounts of laboratory data with typical fault types. Even so, when considering the variability of real data due to environments, it is clear that there may exist significant discrepancies between the real and laboratory data. While machine learning-based PD identification models trained on laboratory data (referred to as the source domain) can be used on real data (referred to as the target domain), applying trained models with such a domain shift might impact the model's predictive performance. When considering the relative simplicity of laboratory data and the variability of real data, reducing the perceptible difference between data in the two domains can improve the trained model's ability to generalize. Such methods are referred to as domain adaptation (DA) techniques.

Figure 1C:
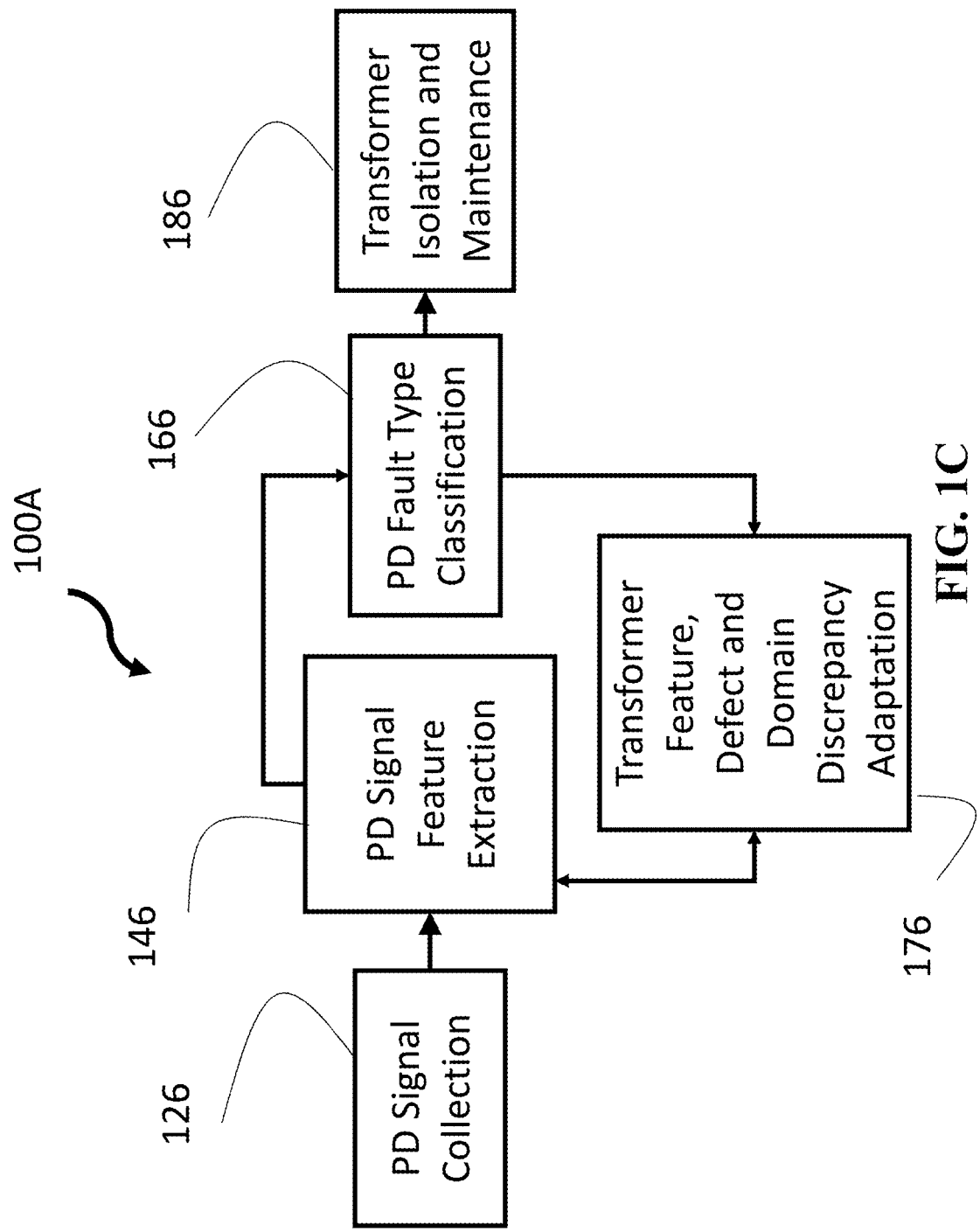
FIG. 1C shows the flowchart of the system of partial discharge diagnosis and control, according to embodiments of the present invention.

FIG. 1C represents the flowchart of the partial discharge diagnosis and control system 100A. The system 100A comprises of five units, namely PD signal collection unit 126, feature extraction unit 146 for PD signal, transformer feature, defect and domain discrepancy adaptation unit 176 PD, partial discharge fault type classification unit 166, and transformer isolation and maintenance unit 186. PD signal collection unit 126 encompasses sensors designed to sense the physical phenomena of PD, which emits energy of different kinds. The feature extraction 146 for the PD signals unit extracts the representative features from the raw data. Further, these features are tuned in transformer feature, defect and domain adaptation unit 176, and then are used in the PD diagnosis unit 166, which is generally furnished with pattern recognition methods such as artificial neural network for identifying the source or type of PD. Each type of defect has its distinguished degradation properties whose PD pattern can be used to figure out the insulation condition. The last transformer isolation and maintenance unit 186 is examining the insulation condition of transformer, and preforming repairing, replacement actions or further diagnosis if necessary.

The transformer feature, defect and domain discrepancy adaptation unit 176 can be implemented using a combination of a feature discrepancy discriminator, a fault type discrepancy discriminator, and a domain discrepancy discriminator to deal with corresponding discrepancies between features, fault types and domains individually. The unit 176 can also be implemented as a domain discrepancy discriminator, but adding the feature discrepancy discrimination and the fault type discrepancy discrimination into the parameter optimization process for the feature extraction unit and the fault type classification unit through corresponding cost/loss functions.

The transformer isolation and maintenance unit 186 can generate different commands or signals to the power grid control system based on availability of spare power transformer with same/similar capability of the online power transformer with confirmed significant partial discharge fault(s)/defect(s).

If a spare power transformer is available and ready for service, the PD sensor signal of the online transformer is greater than a replacement threshold and the fault type is identified, the unit can generate and transmit a transformer replacement signal through the power grid control system to the set of switches connected to the online transformer to isolate the online transformer and replace the online transformer to a replacement transformer.

If a spare power transformer is not available, but the sensor signal of the online transformer is greater than a defective threshold and a fault type is identified, the unit will generate and transmit a power transformer isolation signal through the power grid control system to a set of switches relevant to the online transformer to disconnect the online transformer from service, wherein the relevant switches include switches to isolate the online transformer and re-route power supply of customers connected to the online transformer.

Figure 1D:
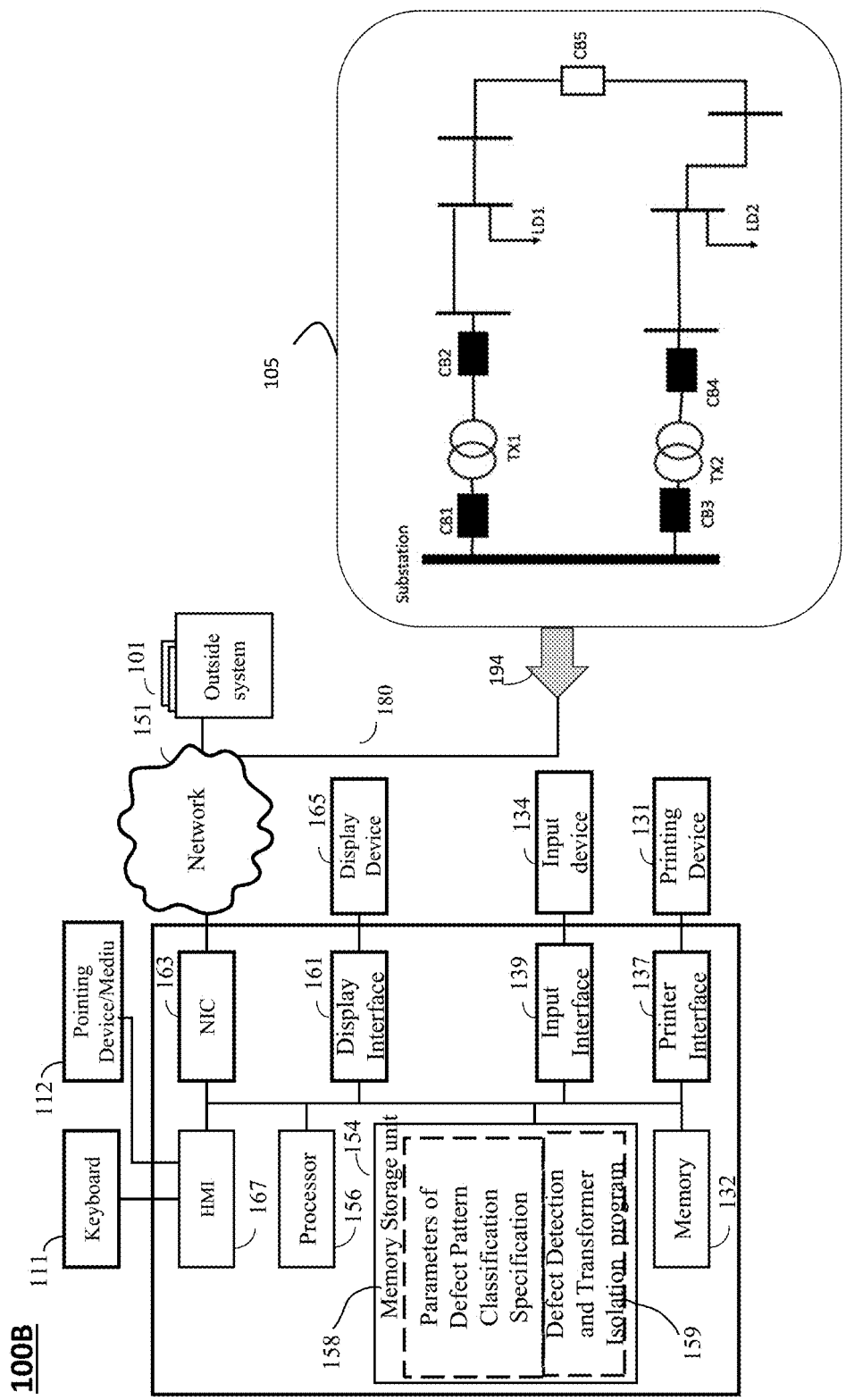
FIG. 1D shows a schematic of a transformer partial discharge diagnosis and control system, according to embodiments of the present invention.

FIG. 1D shows a schematic of a transformer partial discharge diagnosis and control system, according to embodiments of the present invention.

The transformer partial discharge diagnosis and control system 100B includes a human machine interface (HMI) 167 connectable with a keyboard 111 and a pointing device/medium 112, a processor 156, a storage device 154, a memory 132, a network interface controller 163 (NIC) connectable with a network 151 including local area networks and internet network, a display interface 161 connected to a display device 165, an input interface 139 connectable with an input device 135, a printer interface 137 connectable with a printing device 131. The memory 132 is configured to load the defect/fault detection and isolation program 159 by associating with the storage device 154 when executing the method implemented in 100A. In some cases, the memory 132 and the storage device 154 may be referred to as a memory.

The partial discharge diagnosis and control system can receive electric signals 194 indicating timeseries measurements of applied voltages and partial discharge voltages of transformers 115 arranged in a power distribution system 105 via the network 151 connected to the NIC 163. The network 151 is connected to an outside system(s) 101 that can provide control signals to the transformers 115 and associated switches of the distribution systems 105 for performing remote control of the operation status of transformers. Further, the partial discharge diagnosis and control system 100B can provide the outside system 101 fault pattern identification data (signals) via the network 151 so that the outside system 101 can control switching operation associated with transformers 115 arranged in the distribution system 105. Further, the partial discharge diagnosis and control system 100B can be controlled from the outside system 101 by receiving data (signals) of the partial discharge diagnosis and control system 100B via the network 151.

The storage device 154 includes parameters of fault/defect pattern classification specification 158 with respect to transformers 115 and a partial discharge diagnosis and control program module 159. The input device/medium 134 may include modules that read programs stored on a computer readable recording medium (not shown).

For identifying a fault/defect type in the transformer 115, the partial discharge diagnosis and control system 100B may receive the status and measuring data of the transformer from the sensors 125 included in the transformer 115.

In accordance with some embodiments of the present invention, the distribution system 105 may include a set of transformers 115 connected with normally closed circuit breakers/switches 135 to feed powers from the substation to the loads through distribution lines, and additional normally-open switches/breakers for reconfiguring power supply routes of the distribution system when there is a need for some transformers to disconnect the service for further diagnose and maintenance. The transformer 115 includes PD sensors 125 connected with a power grid control system (not shown) installed in the distribution system 105. The power grid control system connected to the sensors is configured to operate and control the transformers 115 by isolating and restoring the energized statues of transformers using switches connected to the transformers in response to receiving a defect identification command indicative of the fault location and the fault type of faults within the transformers. In this case, the fault identification command is transmitted from the partial discharge diagnosis and control system 100B to power grid control system. In some cases, the power grid control system is installed in the outside system 101 to control the transformers via the outside system 101. Further, the fault identification command can be transmitted to a display monitor including a display interface (not shown) installed in the outside system 101 to indicate a warning to an operator of the outside system 101 regarding the condition of the fault location and the fault type of transformer faults. The partial discharge diagnosis and control system 100B uses the fault identification command to show the operation status of the transformer 115 on the display monitor of the outside system 101 by transmitting the fault identification command to the display interface of the display monitor install in the outside system 101. The partial discharge diagnosis and control system 100B uses the interface 163 to receive timeseries measurement data indicating applied voltage and partial discharge voltages of transformers measured for sensors via the network 151 (communication network). The memory 132 can load the computer-executable programs stored in the storage 154, in which the computer-executable programs include a set of parameters for defect pattern classification specification 158 and a partial discharge diagnosis and control program (module) 159 configured to identify the defect types caused in the transformers 115 and determine the scheme for isolating and maintenance scheme for the transformers 115 in the distribution system 105. At least one processor 156 in connection with the memory 1327 and the interface 163 are used to perform the partial discharge diagnosis and control program 159 loaded from the storage 154. For instance, when performed by the processor 156, the partial discharge diagnosis and control program 159 causes the processor 156 to receive applied voltage and partial discharge voltage measurements 194 from sensors 125, and the processor 156 determines if an insulation broken fault is caused in the transformer 115 by executing the partial discharge diagnosis and control program 159 to examine the partial discharge voltages to see if an existence of fault is detected. If a fault is confirmed, the partial discharge diagnosis and control program 159 further requests the processor 156 to provide the defect pattern classification specification parament's from the storage 154, and then the program 159 determines the fault type based on the normalized measurements of applied voltages and partial discharge voltages. Then the processor 156 outputs a fault type indicating a possible location of the fault, and associated switch operations required by the determined fault control scheme. Further, the interface (NIC) 163 can receive the measured signals 194 every preset period of time via the network 151 from the transformer 115. When the partial discharge diagnosis and control system 100B does not determine/detect any faults/defects of the transformers 115 while receiving timeseries measurements of partial discharge voltages indicative of predetermined normal signal ranges from sensors installed in the transformers 115, the partial discharge diagnosis and control system 100B can produce a normal status command and transmit the signal of the normal status command to the display interface of the display monitor installed in the outside system 101 via the network 151 to show the normal operation status of the transformer 115 on the display monitor of the outside system 101. The data of the normal status command and fault identification command produced by the partial discharge diagnosis and control system 100B can be transmitted to other maintenance system(s) via the network 151 to allow it (them) to monitor the operation statuses of the transformers 115.

The online transformer for this invention is an oil-filled core-type or shell-type transformer without data on actual failures.

FIGS. 2A-2E illustrated several different typical PD defects occurring in this type of transformers.

FIG. 2A illustrates a first type of defect/fault of the transformer indicating a floating electrode 210 in the transformer, according to embodiments of the present invention.

FIG. 2B illustrates a second type of defect/fault of the transformer indicating a metal protrusion 220 in the transformer, according to embodiments of the present invention.

FIG. 2C illustrates a third type of defect/fault of the transformer indicating a metal particle 230 on surface of insulator in the transformer, according to embodiments of the present invention.

Figure 2E:
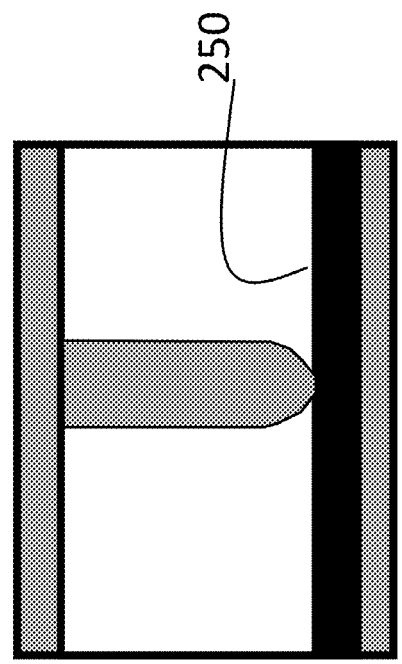
Figure 2D:
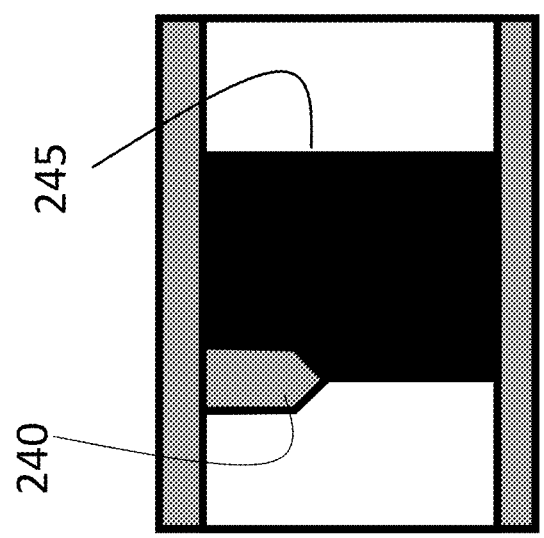

FIG. 2D illustrates a fourth type of defect/fault of the transformer indicating a metal protrusion 240 on the surface of insulator 245 in the transformer, according to embodiments of the present invention.

FIG. 2E illustrates a fifth type of defect/fault of the transformer indicating a surface discharge 250 in the transformer, according to embodiments of the present invention.

Besides collecting faults from actual transformers, the simulated faults are commonly used to generate required measurements based on an international electrotechnical commission (IEC) 60270 PD detection method or other standard techniques.

Figure 3:
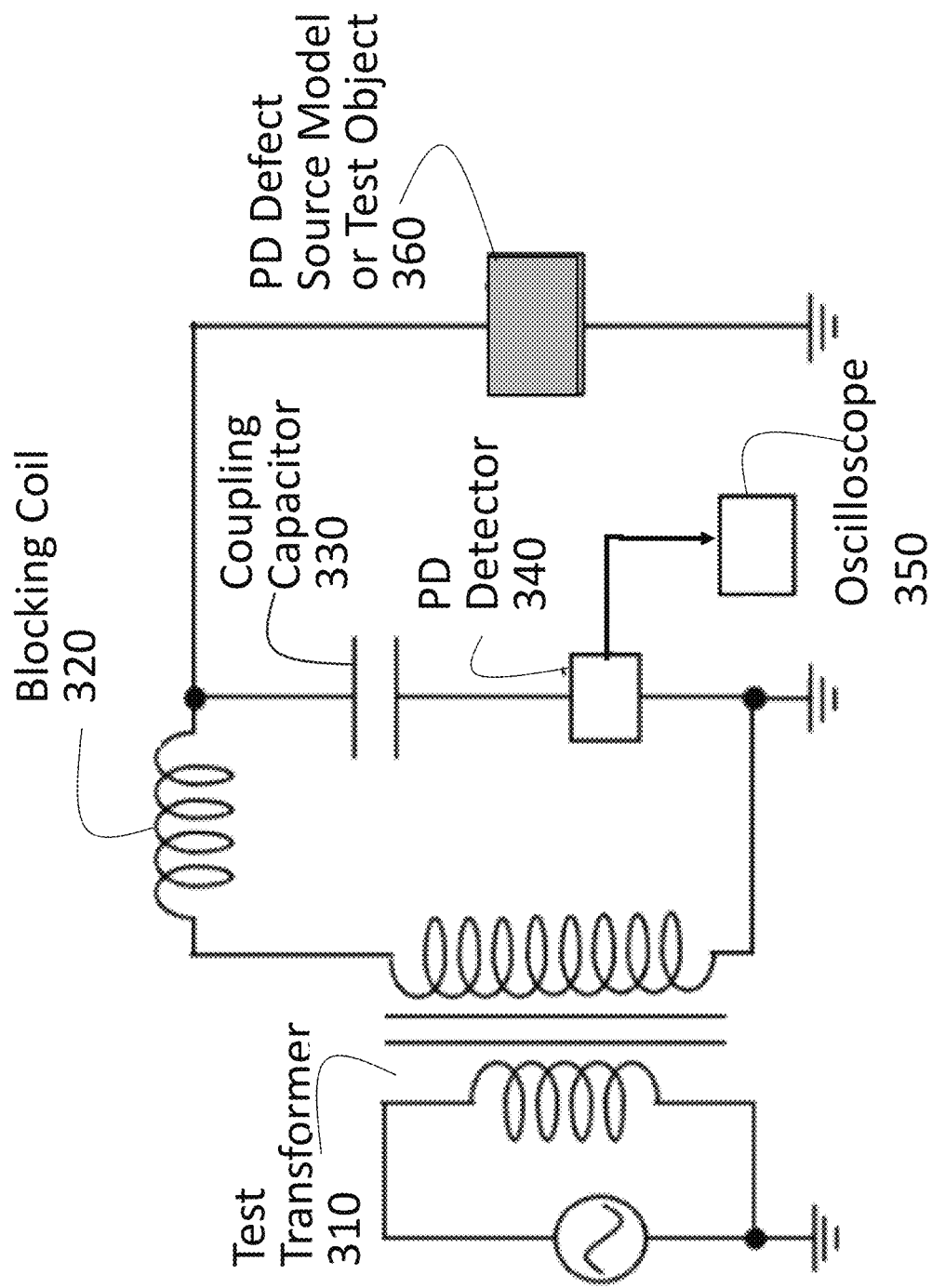
FIG. 3 shows examples of electrical measurements collected from a laboratory transformer for simulated PD faults using IEC 60270 PD detection method, according to embodiments of the present invention.

The electrical measurements are collected from a laboratory transformer for simulated PD faults using IEC 60270 PD detection method as shown in FIG. 3. The test system includes a test transformer 310, a blocking coil 320, a coupling capacitor 330, a PD detector 340 with oscilloscope 350, and a PD defect source model or test object 360.

The data collected from oscilloscopes 350 include applied voltages and PD voltages. The frequency for applied voltage is given by the power frequency of the distribution system, commonly either 60 Hz or 50 Hz. To maintain a reasonable accuracy of model learning, a higher sample frequency, and a larger number of sample events for PD are desired. For example, the sample frequency for PD can be 250 kHz, and each defect type can collect 1000 sample events. Each sample event needs to have enough metering points to cover entire PD variation process for the event, i.e. lasting at least a whole cycle of the power frequency, such as 5000 measuring points if sampling frequency is 250 kHz.

FIGS. 4A-4E illustrate sample events for typical PD defects in the transformer. The line 410 represents the measured applied voltages, and the line 420 represents the measured partial discharge pulses. The horizontal axis 440 represents measuring time in seconds, and the first vertical axis 430 and second vertical axis 420 represent applied and PD voltages in volts, respectively.

Figure 4A:
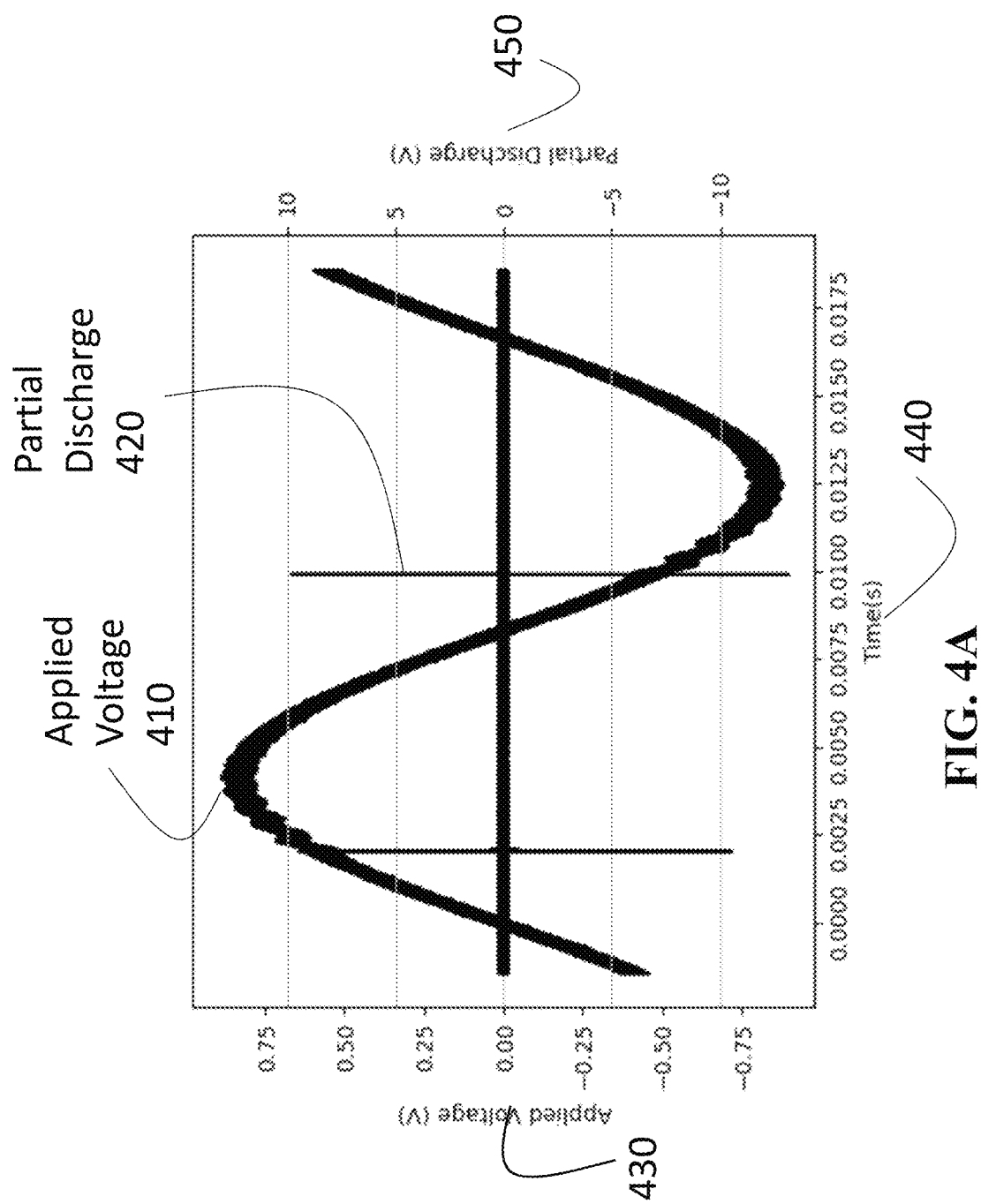
FIG. 4A shows an example of a typical PD event illustrating a floating electrode defect caused in a transformer, according to embodiments of the present invention.

FIG. 4A illustrates a sample event for partial discharge with a first type of fault occurring in the transformer.

Figure 4B:
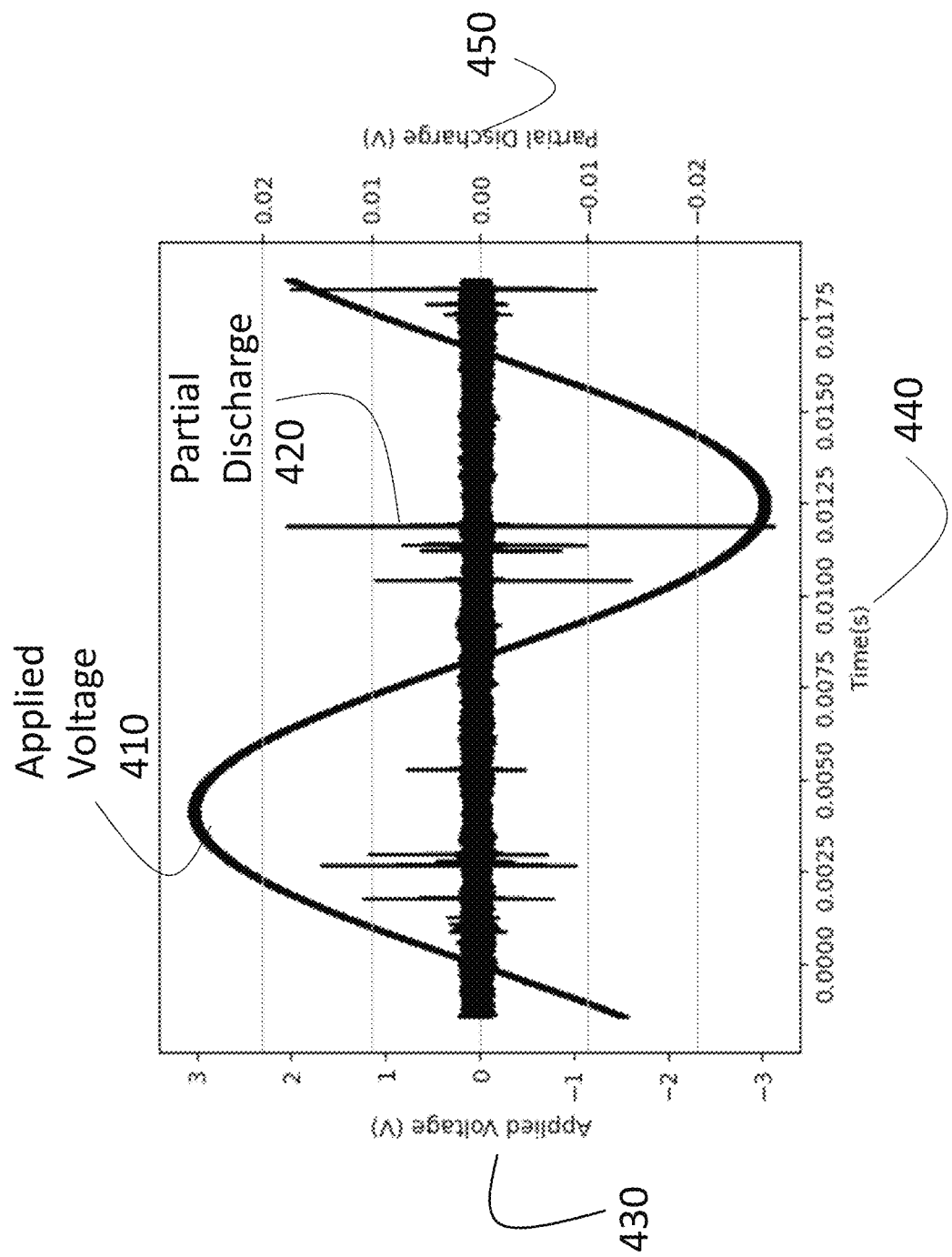
FIG. 4B shows an example of a typical PD event illustrating a metal protrusion defect, according to embodiments of the present invention.

FIG. 4B illustrates a sample event for partial discharge with a second type of fault occurring in the transformer.

Figure 4C:
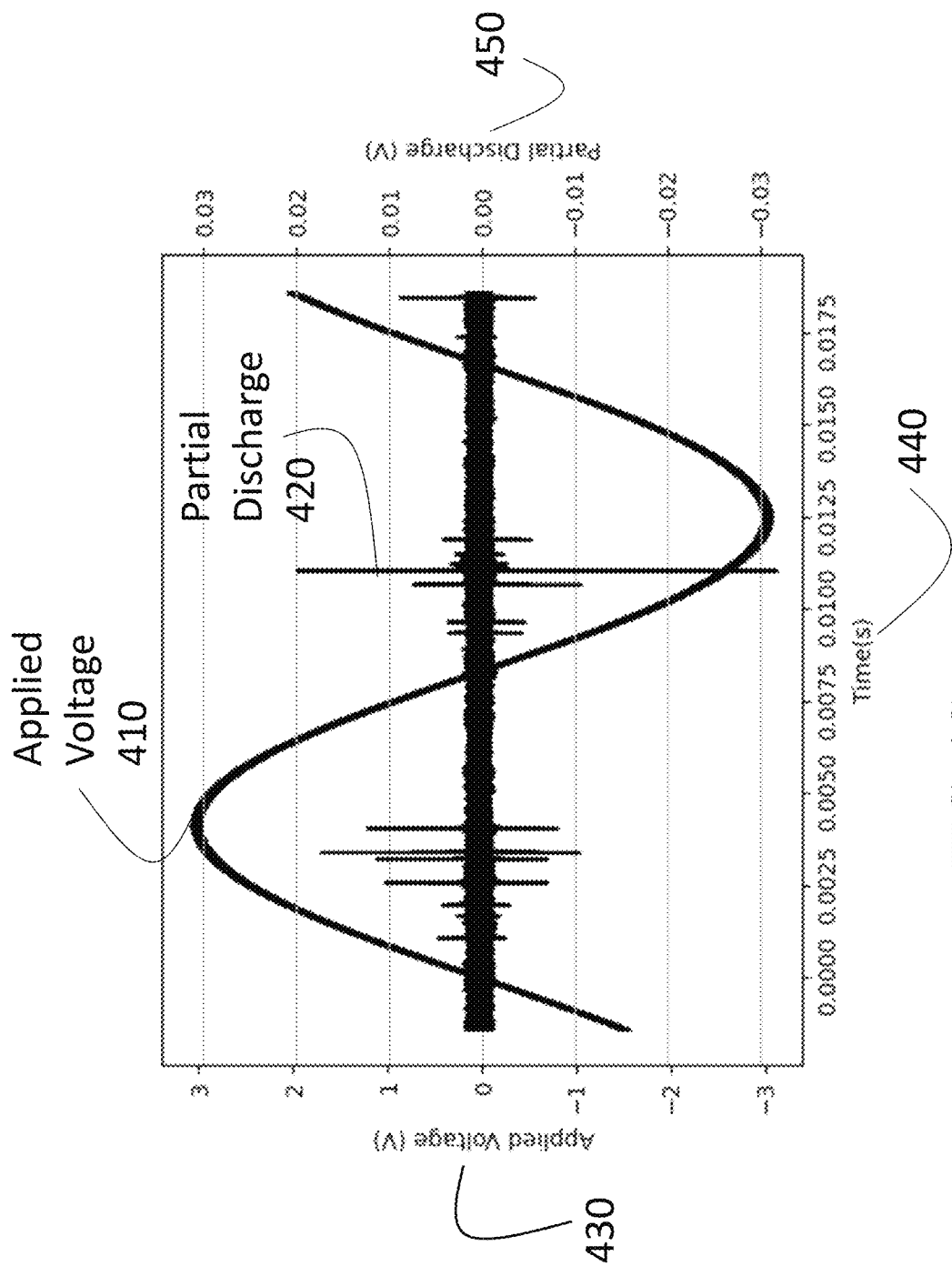
FIG. 4C shows an example of a typical PD event illustrating a metal particles on surface of insulator defect, according to embodiments of the present invention.

FIG. 4C illustrates a sample event for partial discharge with a third type of fault occurring in the transformer.

Figure 4D:
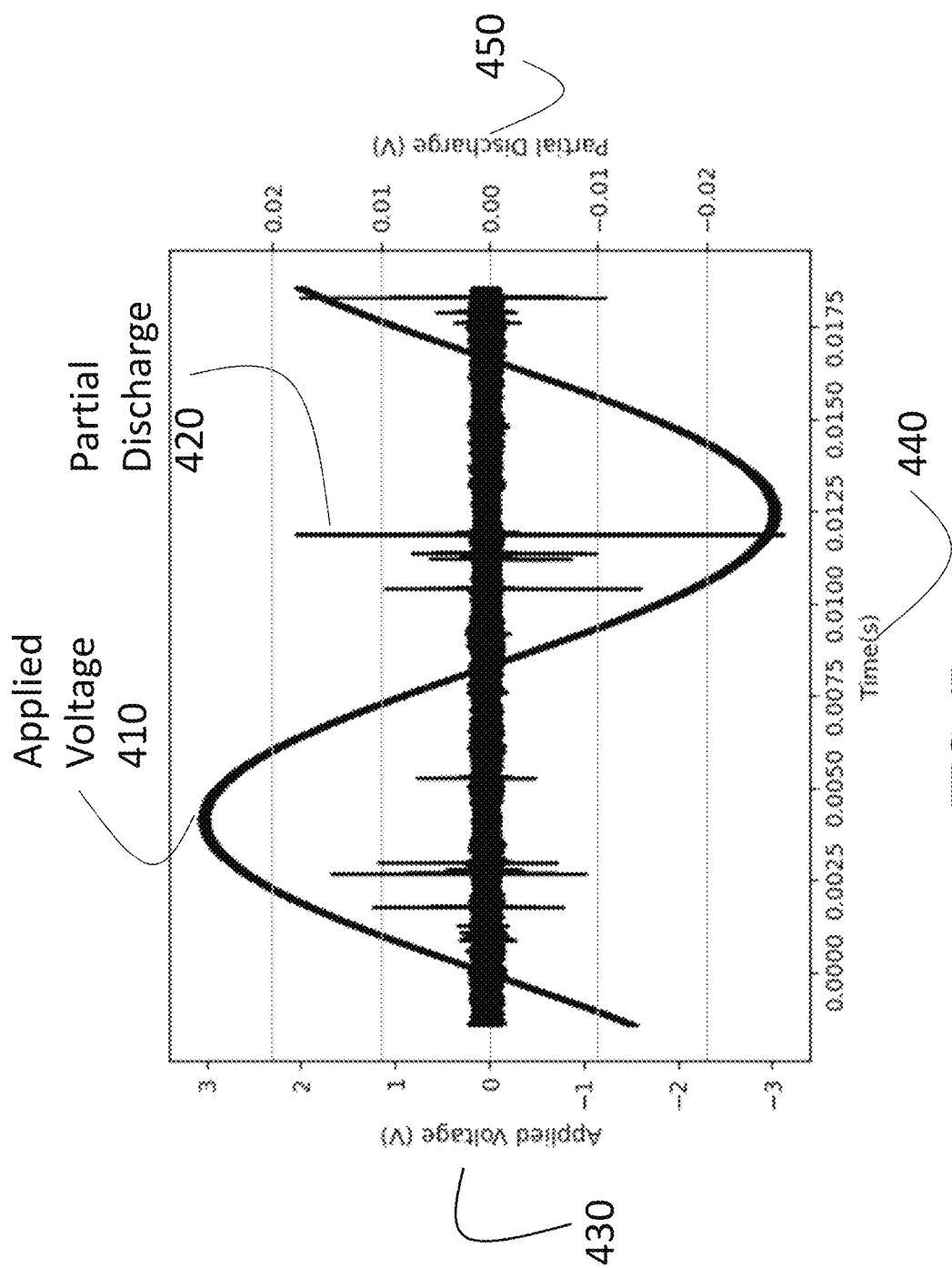
FIG. 4D shows an example of a typical PD event illustrating a defect of metal protrusion into insulator, according to embodiments of the present invention.

FIG. 4D illustrates a sample event for partial discharge with a fourth type of fault occurring in the transformer.

Figure 4E:
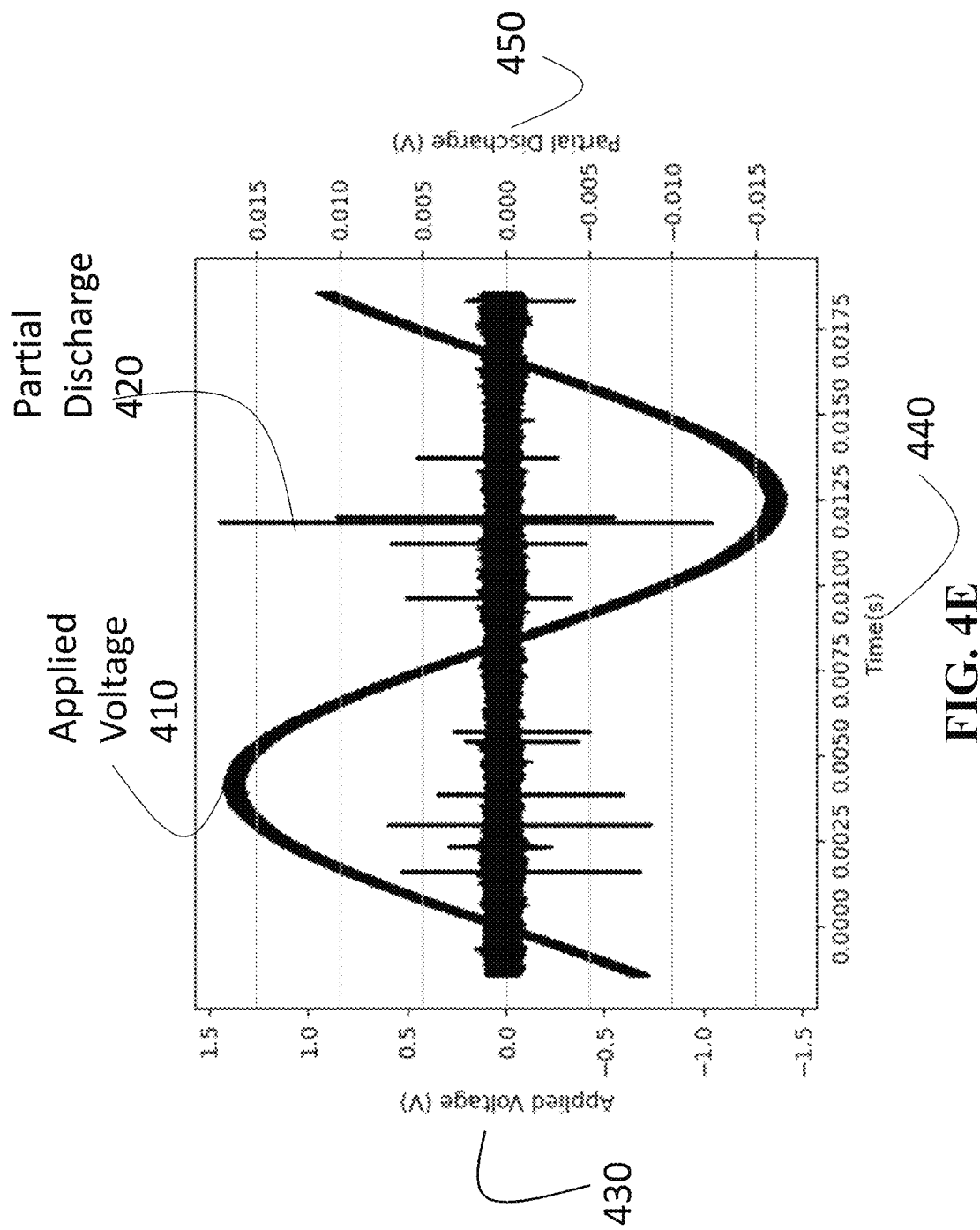
FIG. 4E shows an example of a typical PD event illustrating a surface discharge defect, according to embodiments of the present invention.

FIG. 4E illustrates a sample event for partial discharge with a fifth type of fault occurring in the transformer.

Examining those figures, it can be seen that different fault type has different characteristics of PD voltage variations. Therefore, the fault types can be identified by examining the corresponding PD variation patterns.

However, partial discharge pulses are irregular, short-lived, and non-periodic. The obtained partial discharge signals extracted from the PD sensors contain excess discharge impulse, which is challenging for the pattern processing task. A couple of pre-processing steps are performed on PD measurements, including denoising, normalization and sectionalization.

Figure 5A:
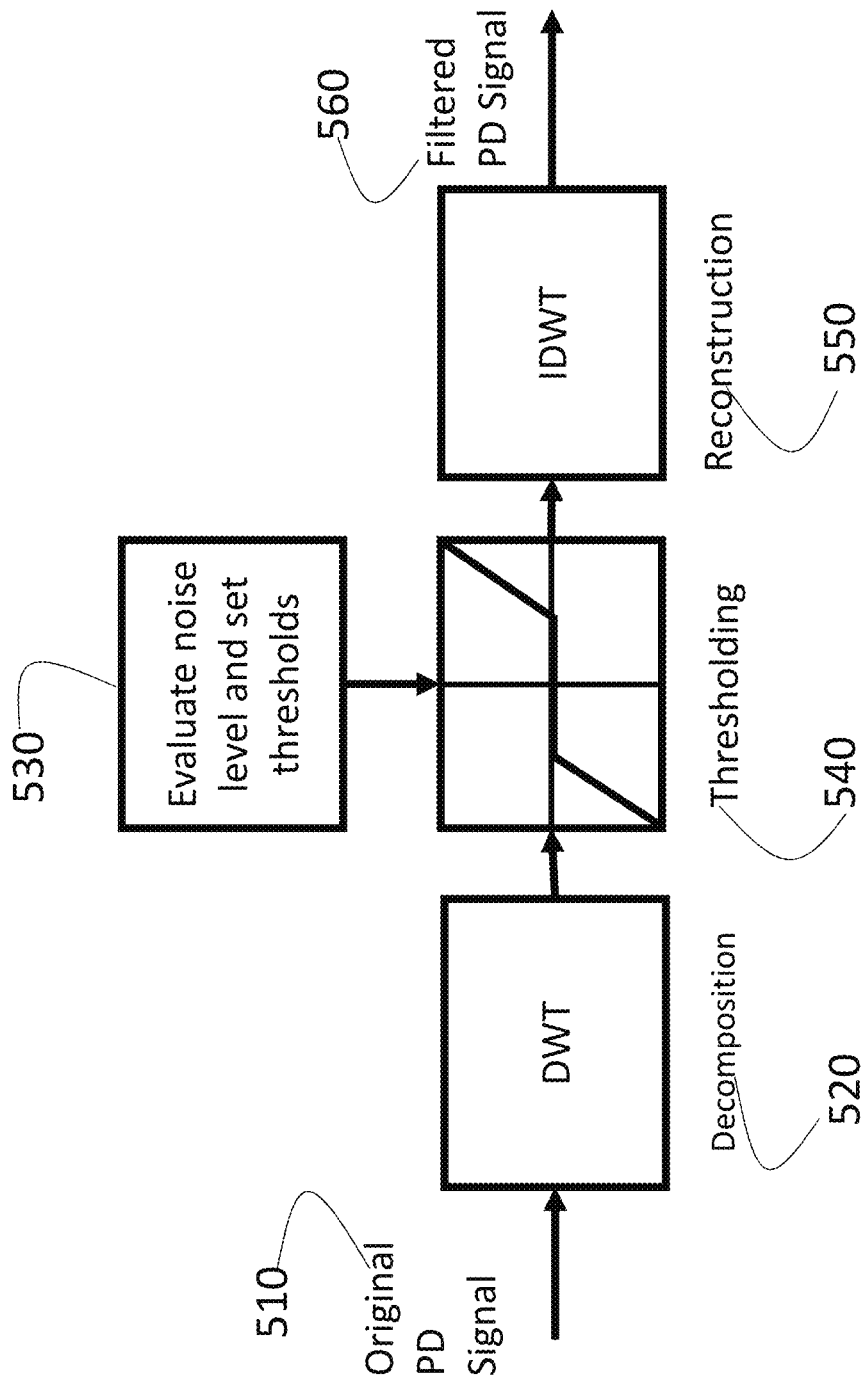
FIG. 5A shows a PD denoising method based on a Wavelet based PD signal denoising procedure, according to embodiments of the present invention.

FIG. 5A illustrates the PD signal denoising procedure based on signal reconstruction using Discrete Wavelet Transform (DWT) technique, which removes noise from the input signal, i.e., applied voltages and PD voltages data from measurement devices. In practical applications, there exists several measurement and system noises, which cause faulty inference from output. The denoising reduces the dependence of algorithm robustness against such noises.

The following steps can be used to denoise the noisy signal 510: (1). Appling a forward discrete wavelet transform 520 to the data with a pre-set wavelet function with a preset-signal extension mode and a preset-decomposition level, and then obtain a list of coefficients for approximation and detail functions. (2). Applying a signal Thresholding technique 540 to detail coefficients with a pre-set thresholding value and a preset thresholding mode 530. (3). Applying an Inverse Discrete Wavelet Transform 550 to reconstruct the signal using approximate and detail coefficients after thresholding with the same settings of basic wavelet function, signal extension mode and decomposition level. The exemplar settings for above DWT denoising are: the wavelet function is a Wavelet Daubechies 4 function, the decomposition level is set as 5, the signal extension mode is periodic-padding, the thresholding mode is soft thresholding, and the thresholding value is 0.4.

Figure 5B:
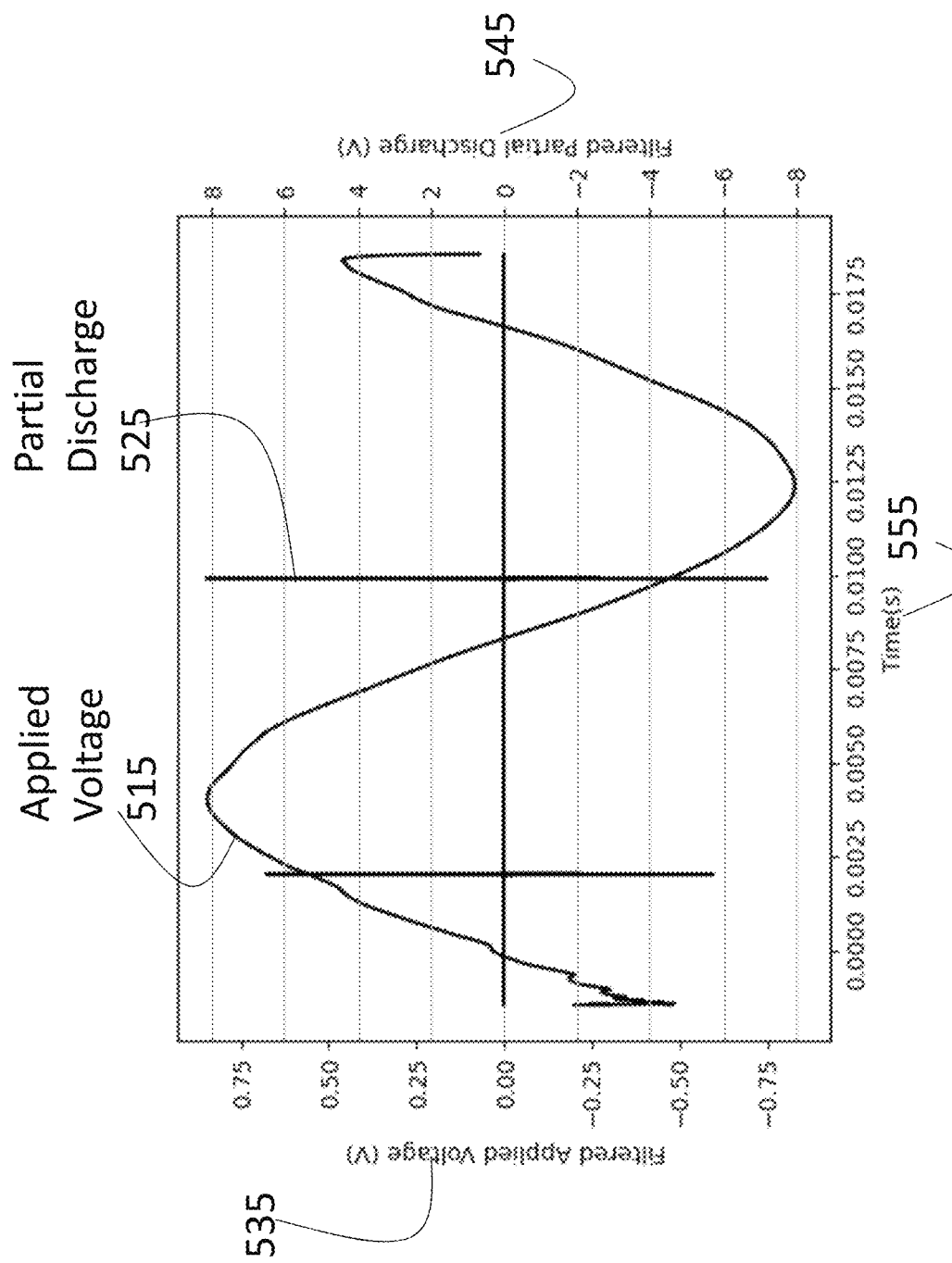
FIG. 5B shows an example of denoised PD signals by the Wavelet based PD signal denoising procedure, according to embodiments of the present invention.

FIG. 5B illustrates the reconstructed applied and PD voltages after denoising corresponding to a PD event of first fault type illustrated by FIG. 4A.

PD phenomenon has a stochastic behavior due to the unpredictable nature of pulsating PD occurrences. Some steps of the PD phenomenon can be predicted statistically, but not accurately due to its complexity. PD pulse properties such as amplitude, shape, and time of occurrence can examine PD phenomena keeping into consideration their random behavior. Stochastic behavior of PD can be due to the probability of introduction of the initial electrons, region of electric field strength, development of discharge in defects, ion space charge generation rate, variation in the gas constitution and density, the existence of ionizing radiation, and formation of PD pulse from the remainder of previous PD pulse. Therefore, timely variations of moments of stochastic distribution are used to represent the PD behaviors.

Figure 6:
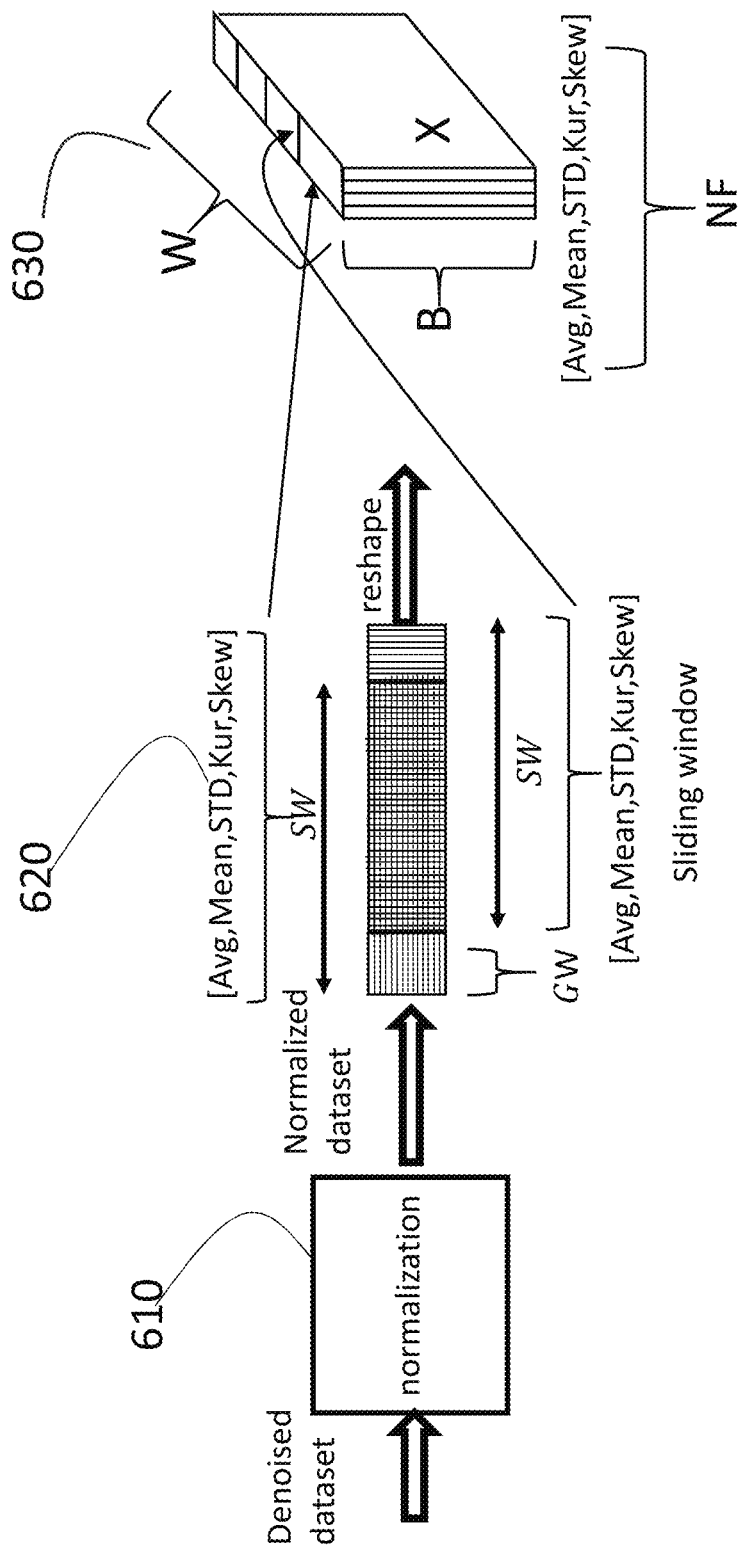
FIG. 6 is a schematic diagram illustrating the sliding window statistics-based PD data preprocessing, according to embodiments of the present invention.

As shown in FIG. 6, the denoised PD signals are further pre-processed preparing for machine learning, including data normalization 610, feature engineering 620, and data reshaping 630. Various normalization techniques can be used, for example, 0~1 and −1~1 normalization.

After normalization to the labeled dataset, the feature engineering technique is used to generate one feature from applied voltages, and four features from partial discharge voltages for each time block. The sliding window method is used to divide the total span of measuring horizon into a set of overlapped time blocks with equal width. As indicated in FIG. 6, the width of each block, and the size of gaps between two consecutive blocks are denoted as SW, and GW respectively. Each original sample event can be converted into W block data samples.

For each block data sample, 5 different statistic-based features are calculated, including the average value of applied voltage (Avg) to represent the applied voltage magnitude and event timing, and the mean (Mean), standard deviation (STD), Kurtosis (Kur), and Skewness (Skew) of partial discharge voltages to represent the variation of partial discharge within the time block. Thus, a series of time-windowed features are generated. The total number of statistic-based features is denoted as NF, and here NF=5.

After that, reshaping is applied to generate input tensor $X_1$, for the source domain i.e. first transformer $T_1$, whose size of B×NF×W, where B denotes the batch size. Similarly, input tensor $X_2$ for the target domain i.e. second transformer $T_2$ can be generated, whose size of B×NF×W. The batch can be generated by randomly selecting samples from available collected sample events from the transformer with given number of times, i.e. the size of batch.

Figure 7A:
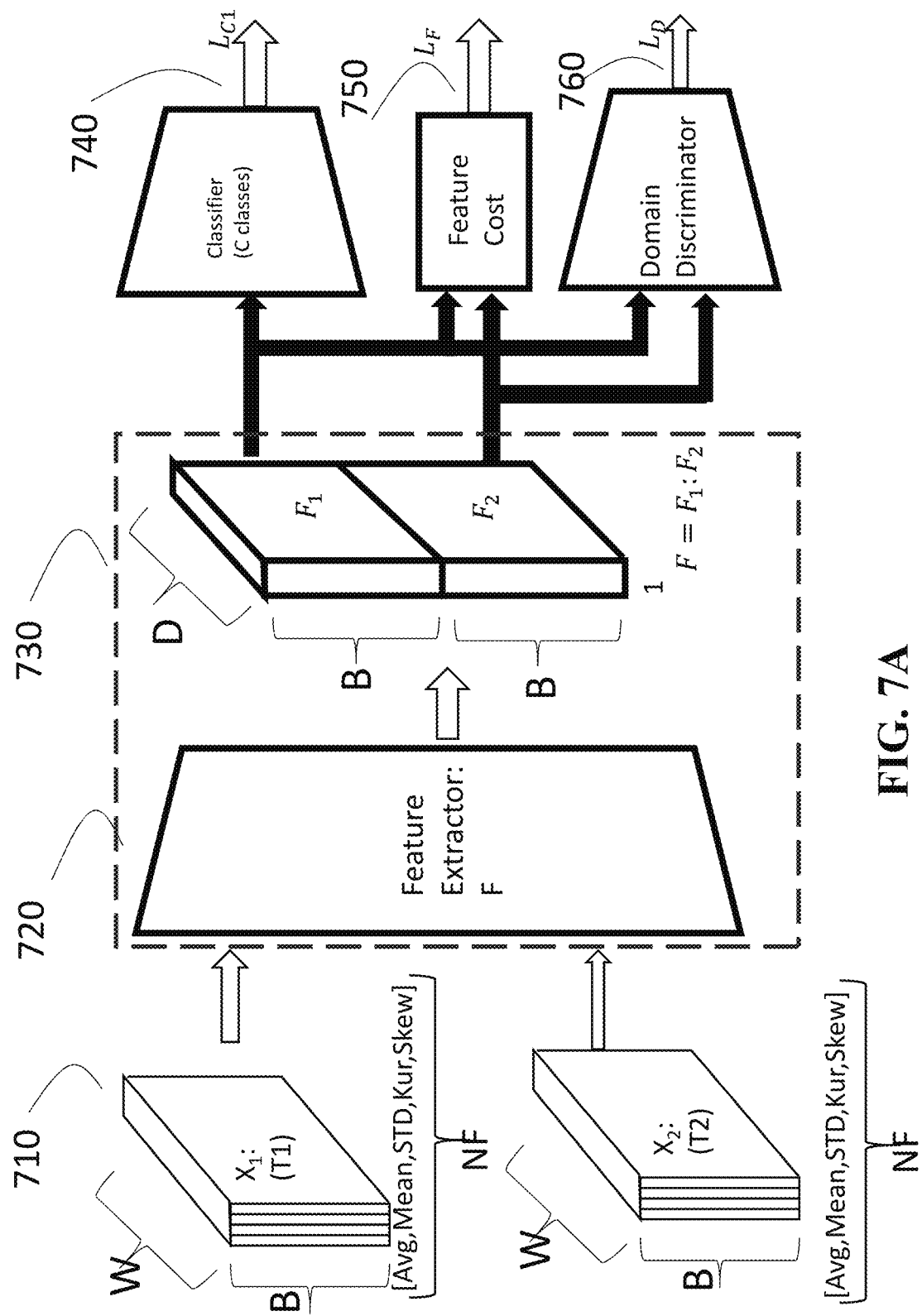
FIG. 7A is a schematic diagram illustrating the transfer learning-based network model for detecting known/predefined defect/fault types, according to embodiments of the present invention.
Figure 7B:
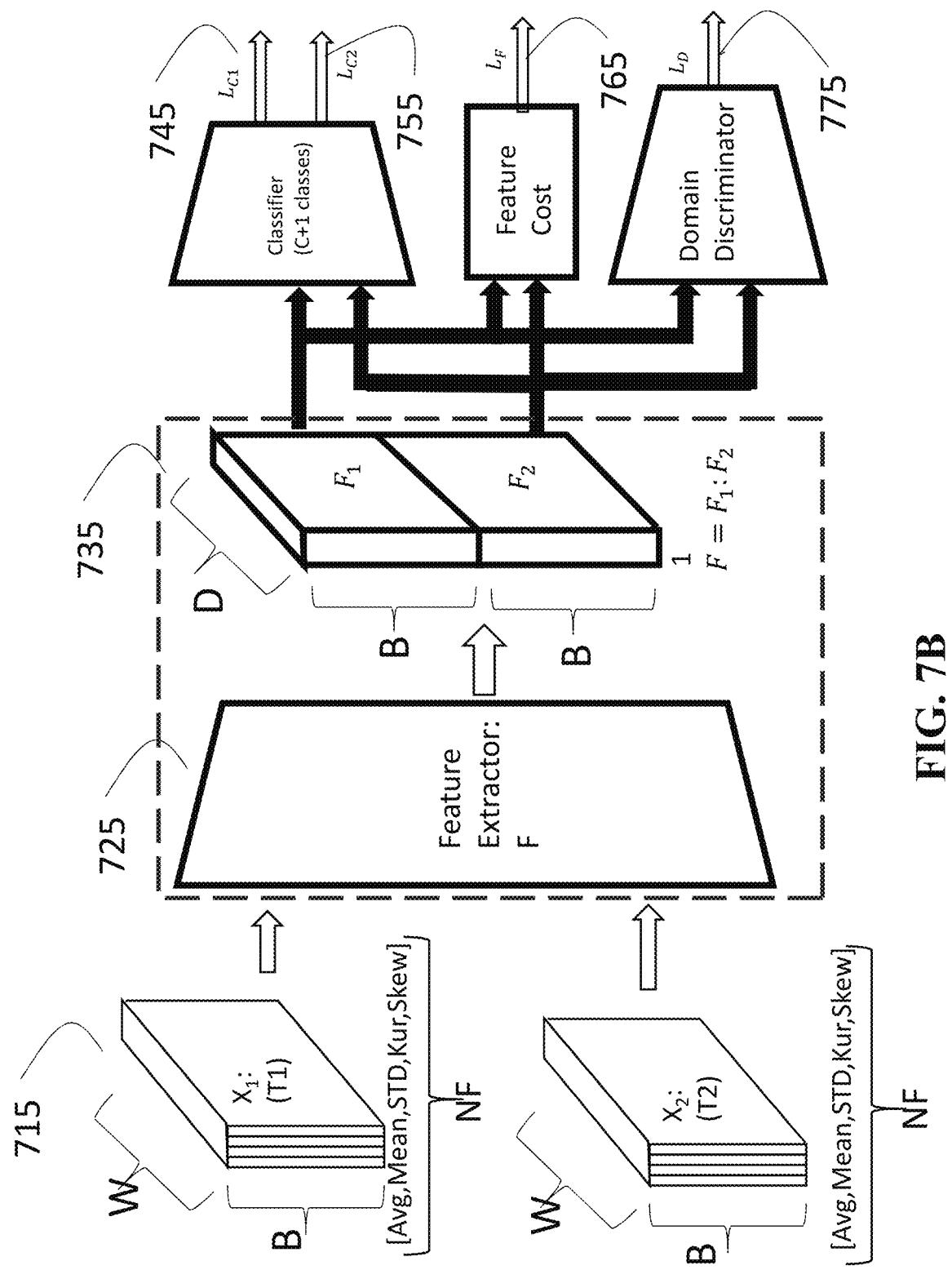
FIG. 7B is a schematic diagram illustrating the transfer learning-based network model for detecting both known/predefined and unknown/non-predefined defect/fault types, according to embodiments of the present invention.

FIGS. 7A-7B show the process for transfer learning based partial discharge pattern classification for all fault type known/predefined cases, and partial fault type known/predefined cases.

FIG. 7A shows the process for transfer learning based partial discharge pattern classification for all fault type known cases. The process uses a feature extractor 720 to extract representative features to represent fault events, a PD fault classifier 740 to classify the fault type based on the extracted representative features, and a domain discriminator 760 being used for domain adaptation. The number of fault types that the classifier is designed to classify is C, and all fault types are pre-given.

The pattern classification process first forms a concatenated tensor 710, $X=[X_1:X_2]$, from steps described in FIG. 6, and then input to the feature extractor F 720, $F=[F_1:F_2]$ 730, an adversarial net based domain discriminator being used for domain adaptation (DA), and PD fault classifier, and relative feature loss computation 750. $F_1$ and $F_2$ are the corresponding extracted representative features from the input features $X_1$ and $X_2$ for the first transformer and second transformer respectively. The parameters of the model are optimized using a weighted sum of loss functions. The loss functions include loss for the classifier $L_{C1}$ 740 using cross entropy loss function, loss for domain adaptation $L_D$ 760 using binary cross entropy function with logits loss, and feature loss $L_F$ 750. Feature loss is integrated jointly considering distinction between partial discharge fault for a particular transformer, and domain shift being exist among transformers. Two contradictory targets are achieved through feature loss, including feature selectivity, and feature invariance.

Let $M_F$ be the feature extractor whose parameters are $\theta_F$, $M_C$ be the PD fault classifier whose parameters are $\theta_C$, and $M_D$ be the domain discriminator whose parameters are $\theta_D$. During the training procedure, the loss for the classifier $L_{C1}(\theta_F,\theta_C)$ is minimized to allow the PD fault classifier to predict true labels as much as possible. The loss of feature $L_F(\theta_F)$ is minimized to maintain a good balance between feature selectivity among different features, and feature invariance among source domain and target domain. In additions the loss for domain adaptation $L_D(\theta_F,\theta_D)$ is maximized to make the domain discriminator difficult to distinguish differences.

The saddle point $(\hat{\theta}_F, \hat{\theta}_C, \hat{\theta}_D)$ are solved the following integrated optimization problem:

$$(\hat{\theta}_F, \hat{\theta}_C) = \arg\min_{\theta_F, \theta_C} [L_F(\theta_F) + \lambda_{C1} L_{C1}(\theta_F, \theta_C) + \lambda_D L_D(\theta_F, \hat{\theta}_D)] \quad (1)$$

$$(\hat{\theta}_D) = \arg\min_{\theta_D} [L_F(\hat{\theta}_F) + \lambda_{C1} L_{C1}(\hat{\theta}_F, \hat{\theta}_C) - \lambda_D L_D(\hat{\theta}_F, \theta_D)] \quad (2)$$

Where $\lambda_{C1}$ and $\lambda_D$ are weighting factors for classifier loss and discriminator loss respectively.

The feature loss $L_F(\theta_F)$ is defined as a weighted sum of cosine similarity distance loss $CSD(F_1, F_2)$, batch-based instance separation loss $BIS(F_1, F_2)$, and batch-based feature decorrelation loss:

$$L_F(\theta_F) = W_{CSD} CSD(F_1, F_2) + w_{BIS} BIS(F_1, F_2) + w_{BFD} BFD(G_1, G_2) \quad (3)$$

Where $w_{CSD}$, $w_{BIS}$ and $w_{BFD}$ are the corresponding weights for cosine similarity distance loss, batch-based instance separation loss, and batch-based feature decorrelation loss, respectively. $F_1 = M_F(X_1, \theta_F)$, $F_2 = M_F(X_2, \theta_F)$.

To encourage feature invariance between domains and reduce domain shift for the entire examples, the cosine similarity distance loss $CSD(F_1, F_2)$ is used, and defined as:

$$CSD(F_1, F_2) = 1.0 - \frac{1}{B^2} \sum_{i=1}^{B} \sum_{j=1}^{B} \frac{F_{1i} \cdot F_{2j}}{\|F_{1i}\|_2 \|F_{2j}\|_2} \quad (4)$$

wherein $B \in \mathbb{N}$ denotes the batch size. $F_{1i} \in \mathbb{R}^{1 \times D}$, $F_{2i} \in \mathbb{R}^{1 \times D}$ denote the i-th representative feature vector extracted at the outputs of feature extractor for the first and second transformer, that is the i-th row vector of the matrices $F_1 \in \mathbb{R}^{B \times D}$, $F_2 \in \mathbb{R}^{B \times D}$, D denotes the feature size of the bottleneck layer.

To favor the pattern classification, instance separation loss is used to encourage the model to learn different features for each training example/event. Furthermore, a feature decorrelation loss encourages the model to learn distinct features. Here we only apply the loss across each batch of time-windowed data. Thus, we use the batch-based instance separation (BIS) loss and batch-based feature decorrelation loss.

The batch-based instance separation loss is defined as:

$$BIS(F_1, F_2) = -\frac{1}{2 \times B \times D} \sum_{i=1}^{B} \log\left(\frac{\exp(F_{1i}(F_{1i})^T)}{\sum_{j=1}^{B} \exp(F_{1i}(F_{1j})^T)}\right) - \frac{1}{2 \times B \times D} \sum_{i=1}^{B} \log\left(\frac{\exp(F_{2i}(F_{2i})^T)}{\sum_{j=1}^{B} \exp(F_{2i}(F_{2j})^T)}\right) \quad (5)$$

The batch-based feature decorrelation loss is defined as:

$$BFD(G_1) = -\frac{1}{2 \times B \times D} \sum_{i=1}^{D} \log\left(\frac{\exp(G_{1i}(G_{1i})^T)}{\sum_{j=1}^{D} \exp(G_{1i}(G_{1j})^T)}\right) - \quad (6)$$

$$\frac{1}{2 \times B \times D} \sum_{i=1}^{D} \log\left(\frac{\exp(G_{2i}(G_{2i})^T)}{\sum_{j=1}^{D} \exp(G_{2i}(G_{2j})^T)}\right)$$

where $G_{1i}$ and $G_{2i}$ denote the i-th row vector of $G_1$ and $G_2$ with $G_1 = (F_1)^T$, $G_2 = (F_2)^T$.

The classifier loss $L_C(\theta_F, \theta_C)$ is defined using cross-entropy loss function calculated using the fault events of the first transformer with all fault types known:

$$L_{C1}(\theta_F, \theta_C) = -\frac{1}{B} \sum_{i=1}^{B} \sum_{c=1}^{C} (y_{1ic} \log p_{1ic}) \quad (7)$$

Where $y_{1ic}$ is the indicator for the truth fault type of the i-th fault event from the first transformer. $p_{1ic}$ is the predicted probability for fault event belonging to fault type c generated by fault classifier. C is the total number of fault type.

The domain discriminator loss $L_D(\theta_F, \theta_D)$ is defined as a binary cross entropy function with logits loss:

$$L_D(\theta_F, \theta_D) = -\frac{1}{B} \sum_{i=1}^{B} (z_{D1i} \log p_{D1i} + (1 - z_{D1i}) \log(1 - p_{D1i})) - \quad (8)$$

$$\frac{1}{B} \sum_{i=1}^{B} (z_{D2i} \log p_{D2i} + (1 - z_{D2i}) \log(1 - p_{D2i}))$$

Where $p_{D1i}$ and $p_{D2i}$ are the probability outputs of domain discriminator that ranges from [0,1] for indicating the i-th event belonging to the first transformer and the second transformer. $z_{D1i}$ and $z_{D2i}$ are the indication for ground truth data source for the transformer, in which 0 stands for the first transformer, and 1 stands for the second transformer.

During the training, the sample events for source or target domain are split according to some ratio, such as 60:40 into training datasets and testing datasets. The AdamW algorithm is used as the optimizer for learning. AdamW optimization is a stochastic gradient descent method that is based on adaptive estimation of first-order and second-order moments with an added method to decay weights.

FIG. 7B shows the process for transfer learning based partial discharge pattern classification for partial fault type known cases. This process handles the cases that fault types not present in the first transformer are occurred which are treated as a (C+1) class/type, where C is the number of known classes/types.

Similarly as FIG. 7A, this process illustrated in FIG. 7B also uses a feature extractor 725 to extract representative features to represent fault events, a PD fault classifier 745 to classify the fault type based on the extracted representative features, and an adversarial net based domain discriminator 775 being used for domain adaptation. The main difference is the classifier is designed to classify (C+1) classes, in which the first C classes are known, and the (C+1) represents all unknown fault classes or types.

As shown in FIG. 7B, The pattern classification process first forms a concatenated tensor 715, $X = [X_1 : X_2]$, and then input to the feature extractor F 725, and get corresponding extracted features $F = [F_1 : F_2]$ 735. The extracted features are further feed to a domain discriminator 775, and PD fault classifier with (C+1) classes 745 and 755, and relative feature loss computation 765. The parameters of the model are optimized using a weighted sum of loss functions, including loss for the classifier of known classes $L_{C1}$ 745 using cross entropy loss function, loss for the classifier of unknown classes $L_{C2}$ 755 using binary cross entropy loss, loss for domain adaptation $L_D$ 770 using binary cross entropy function with logits loss, and feature loss $L_F$ 765.

The loss for the classifier of known classes $L_{C1}$ is defined using cross entropy loss function as:

$$L_{C1}(\theta_F, \theta_C) = -\frac{1}{B}\sum_{i=1}^{B}\sum_{c=1}^{C+1}(y_{1ic} \log p_{1ic}) \quad (9)$$

The loss for the classifier of unknown classes $L_{C2}$ is defined using binary cross entropy loss with events from target domain as:

$$L_{c2} = -\frac{1}{B}\sum_{i=1}^{B}[\tau \log p_{2i(C+1)} + (1-\tau)\log(1-p_{2i(C+1)})] \quad (10)$$

Where $\tau$ is the threshold parameter (such as 0.5). $p_{2i(C+1)}$ is the predicted output probability for i-th fault event from the second transformer that can be classified as class (C+1) i.e. new fault type not predefined. If the threshold parameter set as 0.5, (10) can be simplified as:

$$L_{C2}(\theta_F, \theta_C) = -\frac{1}{2B}\sum_{i=1}^{B}[\log p_{2i(C+1)} + \log(1-p_{2i(C+1)})] \quad (11)$$

Since data of known classes/types tend to have higher probability to be classified into the known fault classes/types than data of new fault classes/types, the probability of being categorized into new fault classes/types $p_{2i(C+1)}$ is higher than that into known fault classes $p_{2i(1\sim C)}$ when the input sample belongs to a new fault type. To quantify the decision boundary between known fault classes and new fault classes, the threshold parameter t should be selected to judge whether the sample belongs to the known or new one.

The saddle point $(\hat{\theta}_F, \hat{\theta}_C, \hat{\theta}_D)$ are solved the following integrated optimization problem:

$$(\hat{\theta}_F) = \arg\min_{\theta_F}[L_F(\theta_F) + \lambda_{C1}L_{C1}(\theta_F, \hat{\theta}_C) - \lambda_{C2}L_{C2}(\theta_F, \hat{\theta}_C) + \lambda_D L_D(\theta_F, \theta_D)] \quad (11)$$

$$(\hat{\theta}_C) = \arg\min_{\theta_C}[L_F(\theta_F) + \lambda_{C1}L_{C1}(\theta_F, \theta_C) + \lambda_{C2}L_{C2}(\theta_F, \theta_C) + \lambda_D L_D(\theta_F, \theta_D)] \quad (12)$$

$$(\hat{\theta}_D) = \arg\min_{\theta_D}[L_F(\theta_F) + \lambda_{C1}L_{C1}(\theta_F, \hat{\theta}_c) + \lambda_{C2}L_{C2}(\theta_F, \hat{\theta}_C) - \lambda_D L_D(\theta_F, \theta_D)] \quad (13)$$

Where $\lambda_{C1}, \lambda_{C2}$ and $\lambda_D$ are weighting factors for classifier loss of predefined fault types, classifier loss for non-predefined fault types, and discriminator loss respectively.

FIGS. 8A-8D shows the component configurations of transfer learning based partial discharge pattern classification model.

Figure 8A:
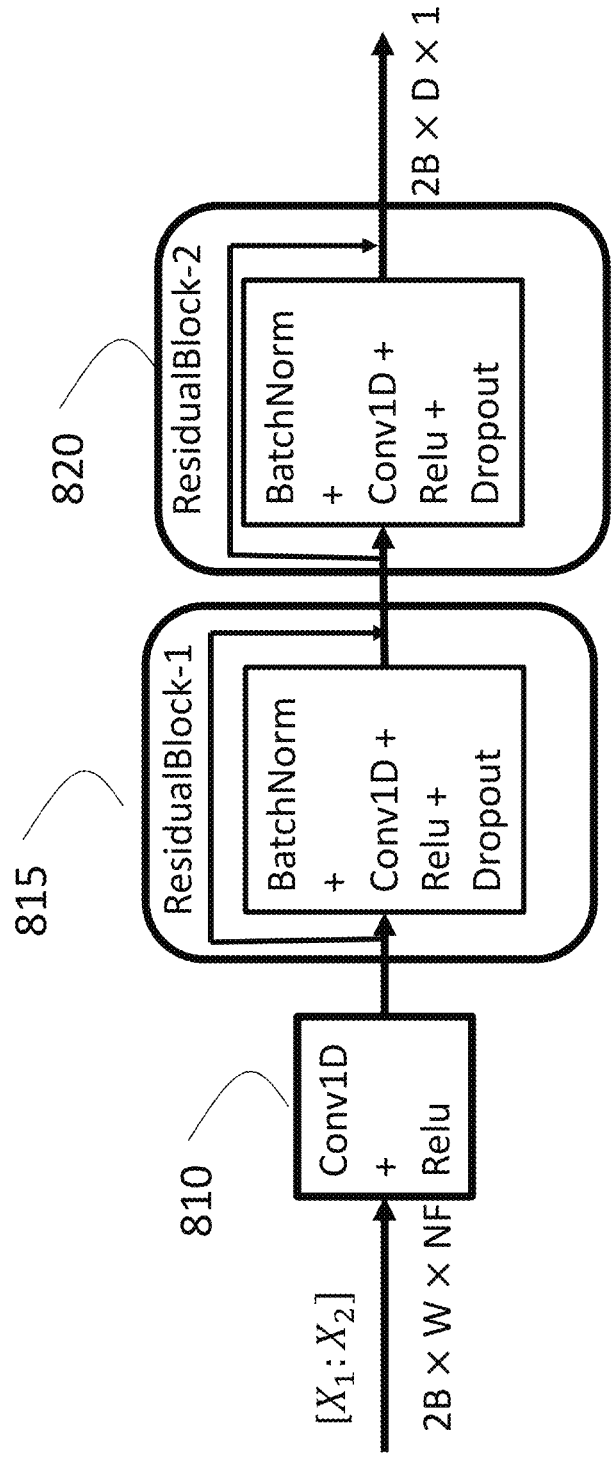
FIG. 8A shows the configurations of feature extractor model, according to embodiments of the present invention.

FIG. 8A shows the configurations of feature extractor model. It includes three layers. The first layer 810 consists of a 1D (i.e. 1-dimensional) convolution (Conv1D) unit and a rectified linear unit (Relu). The second layer 815 and third layer 820 are implemented using a residual block, and each residual block includes a batch normalization (BatchNorm) unit, a Conv1D unit, a Relu unit and a Dropout unit. For each PD example/event, the feature extractor generates a reconstructed features with dimensions D×1 based on the original pre-processed input features with dimensions W×NF. Residual blocks are used since their skip connections can help to address the problem of vanishing and exploding gradients.

Figure 8B:
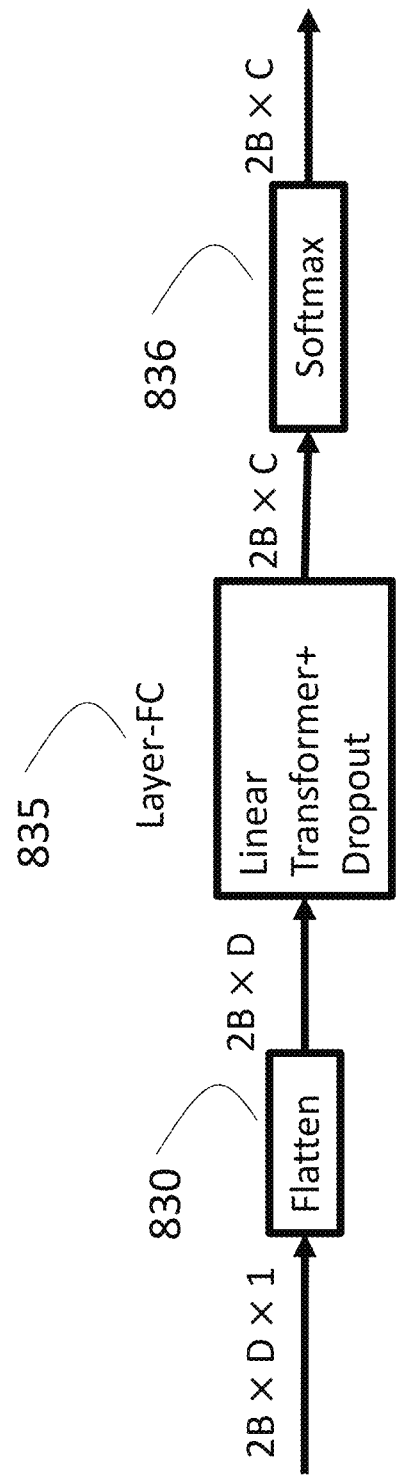
FIG. 8B shows the configurations of classifier model for detecting known/predefined defect/fault types, according to embodiments of the present invention.

FIG. 8B shows the configurations of PD fault classifier model for all fault type known cases. It includes 3 layers. For each PD example/event, the layer 830 flattens the inputs with dimensions D×1 into a vector with size D. Then layer 835 uses a combination of linear transformer unit and a dropout unit to map the input signals with size D into output signals with size C. Layer 836 uses the Softmax function to convert the logits input from layer 835 into probabilities that used to the PD event can be classified into each candidate fault type. The fault type with maximum output probability can be determined as the predicted fault type.

Figure 8C:
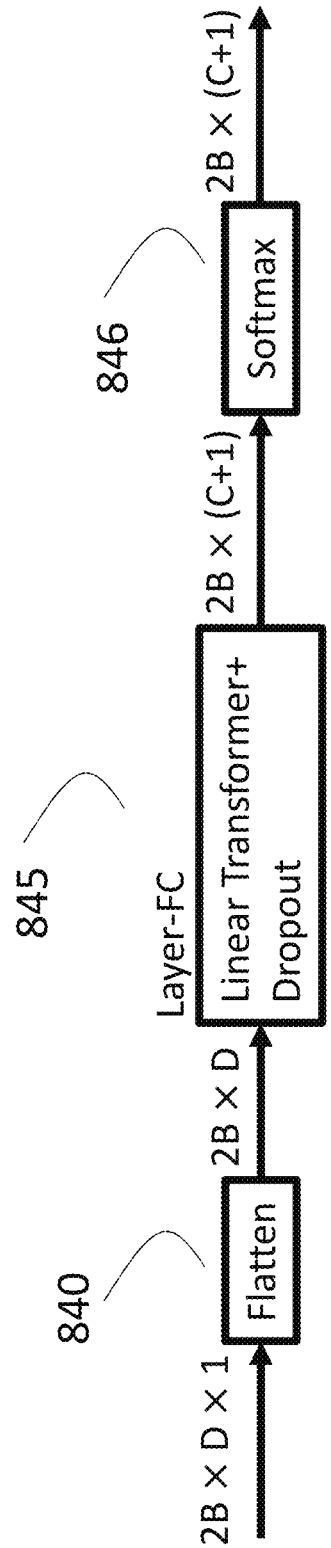
FIG. 8C shows the configurations of classifier model for detecting both known/predefined and unknown/non-predefined defect/fault types, according to embodiments of the present invention.

FIG. 8C shows the configurations of PD fault classifier model for partial fault type known cases. It also includes 3 layers, layer 840, layer 845 and layer 846. Layer 840 flattens the input signal with dimensions D×1 into a vector with size D. Layer 845 then maps the input signals with size D into output signals with size (C+1). After that layer 846 converts the logits inputted from layer 835 into a set of (C+1) output probabilities for candidate fault types in which the fault type with maximum probability can be determined the predicted fault type.

Figure 8D:
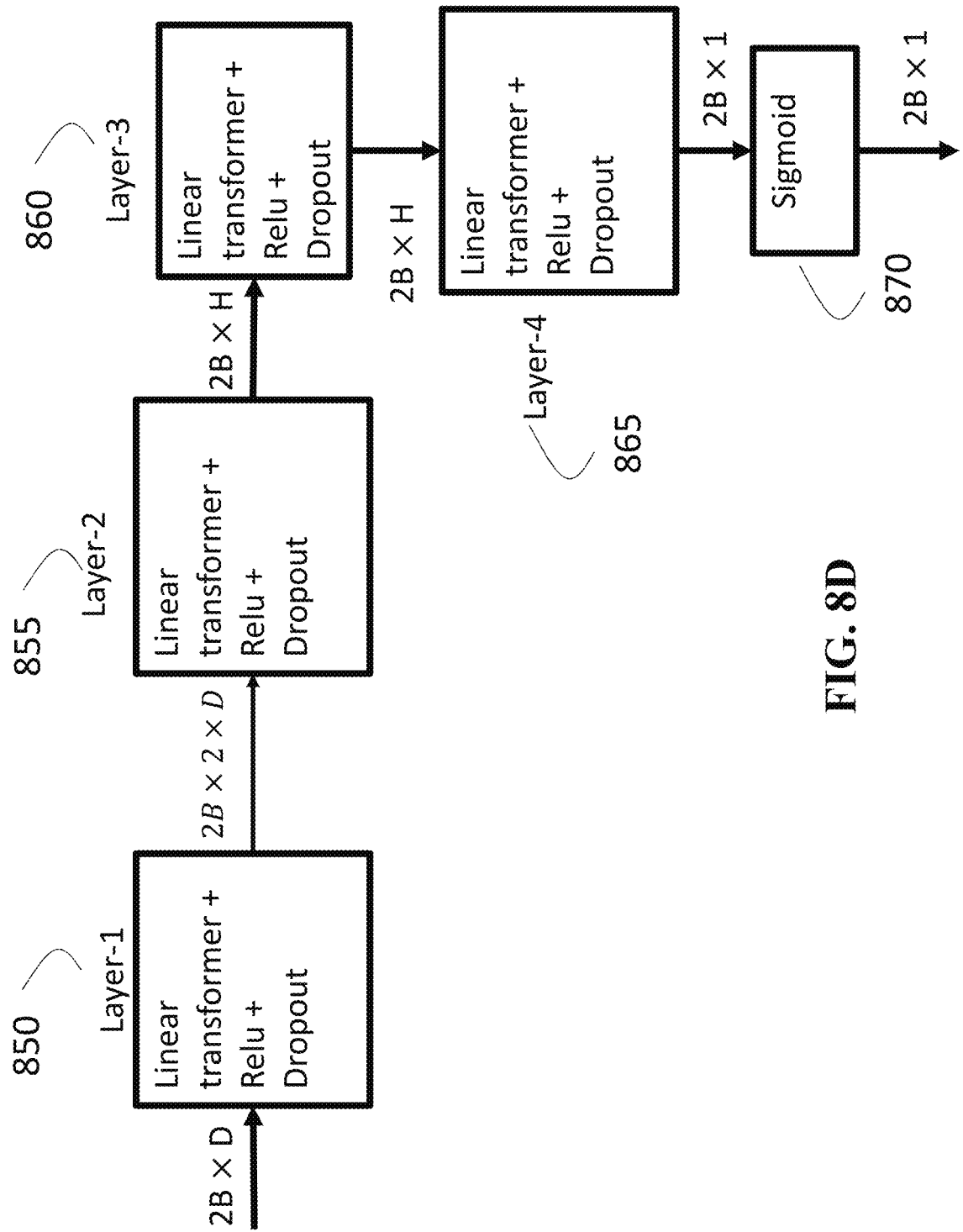
FIG. 8D shows the configurations of domain discrepancy discriminator, according to embodiments of the present invention.

FIG. 8D shows the configurations of the domain discriminator model. It includes five layers, layer-1 850, layer-2 855, layer-3 860, layer-4 865, and last layer 870. All layers except last layer are implemented with a combination of a linear transformer unit, a Relu unit, and a Dropout unit. The last layer is a Sigmoid function unit. For each PD example/event, the domain discriminator determines a probability outputs for indicating the fault example being collected from which transformer based on the outputs of feature extractors in term of a vector with size of D.

Based on the collected fault events included labeled ones from the first transformer, and unlabeled ones from the second transformers, the parameters of feature extractor, fault type classifier, and domain discrepancy discriminator can be determined by iteratively minimizing the above-defined loss/cost functions.

Figure 9:
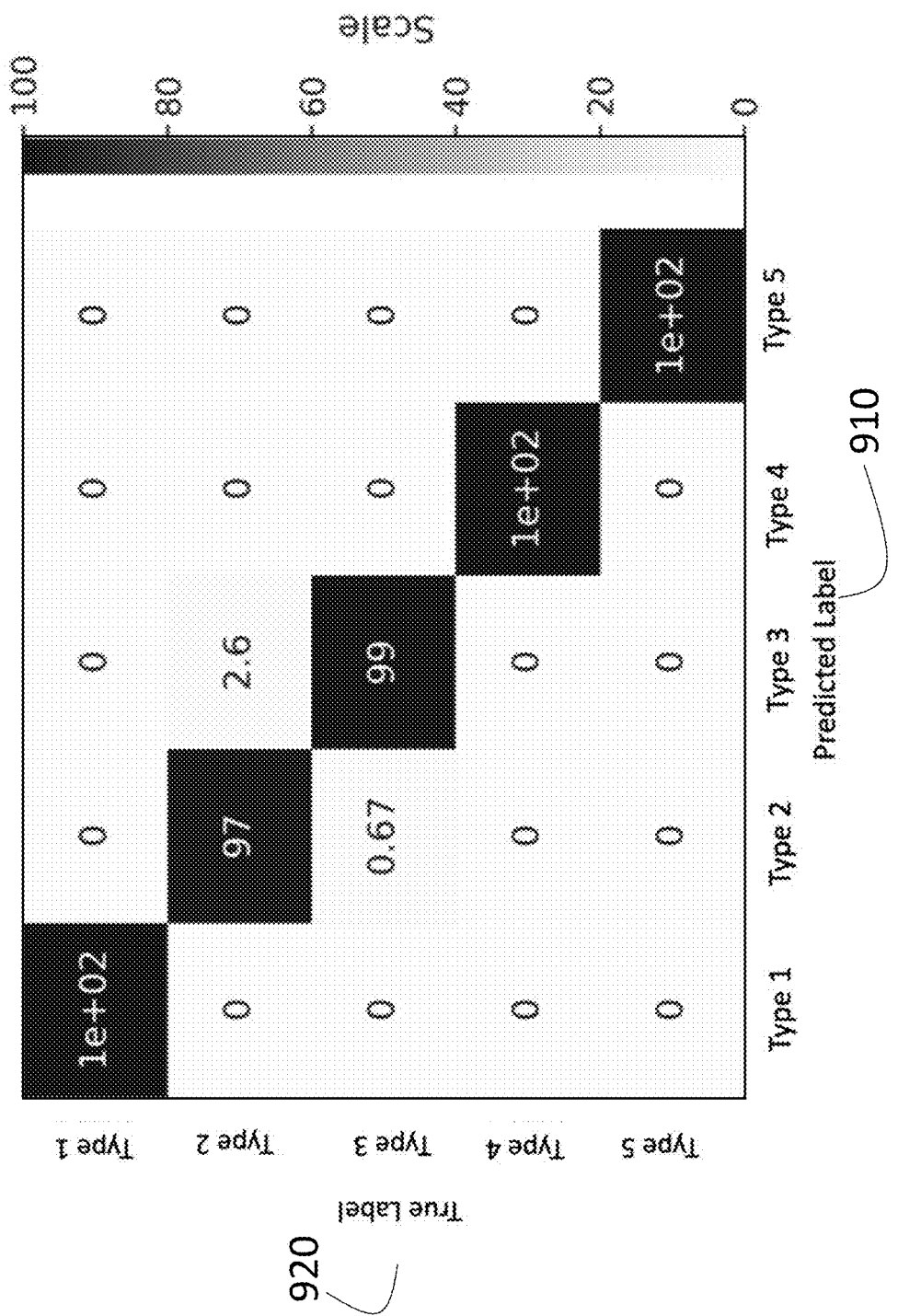
FIG. 9 illustrates the confusion matrix for partial discharge types/classes trained for the laboratory transformer, according to embodiments of the present invention.

FIG. 9 illustrates the confusion matrix for partial discharge types/classes trained for the laboratory transformer under all fault type known. Each row 910 of the matrix represents the instances in an actual class while each column 920 represents the instances in a predicted class.

Figure 10:
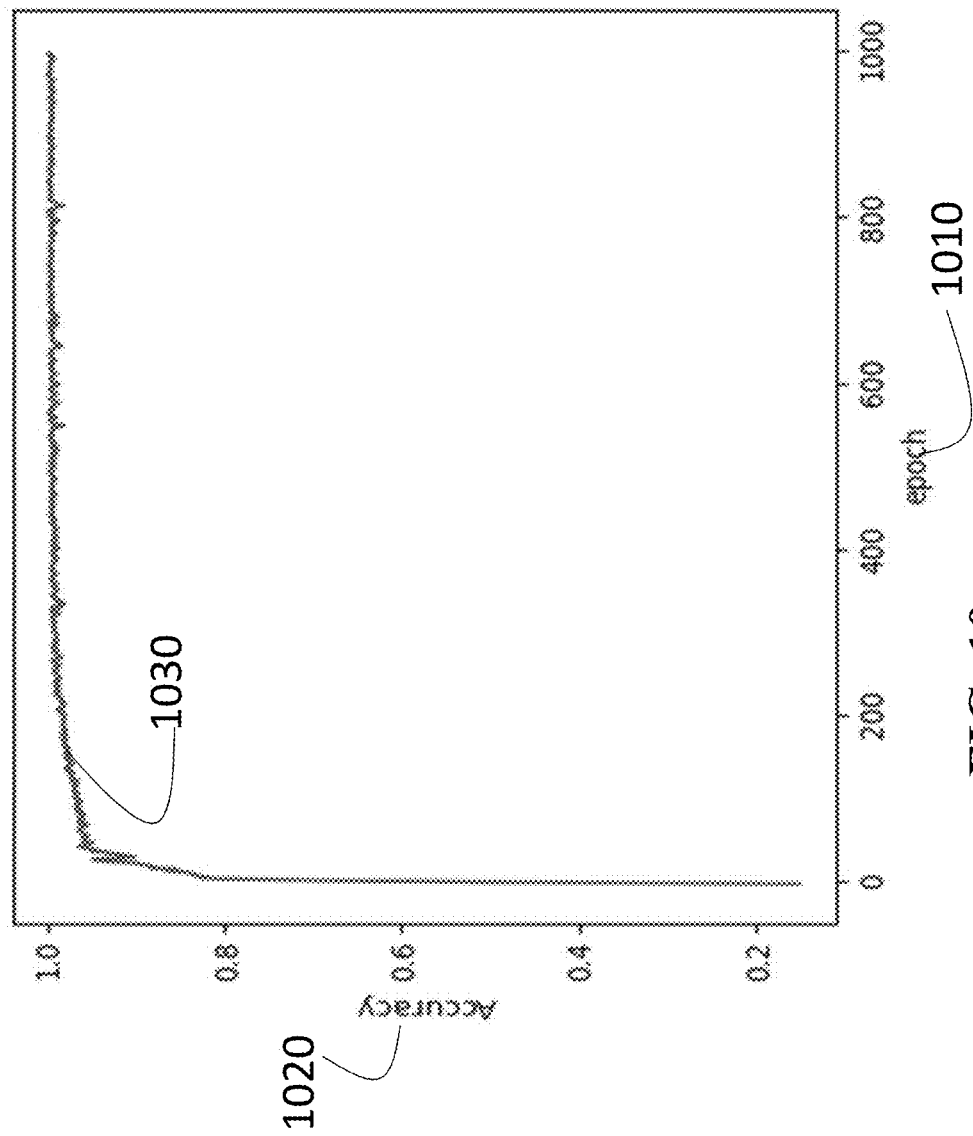
FIG. 10 illustrates the converge process of prediction accuracy for training using a small set of PD signals, according to embodiments of the present invention.

FIG. 10 illustrates the converge process of prediction accuracy for training using a small set of PD signals under all fault type known. The horizontal axis 1010 and vertical axis 1020 represent the number of epochs, and the value of accuracy, and the curve 1030 represents the variation of accuracy over epoch.

Figure 11:
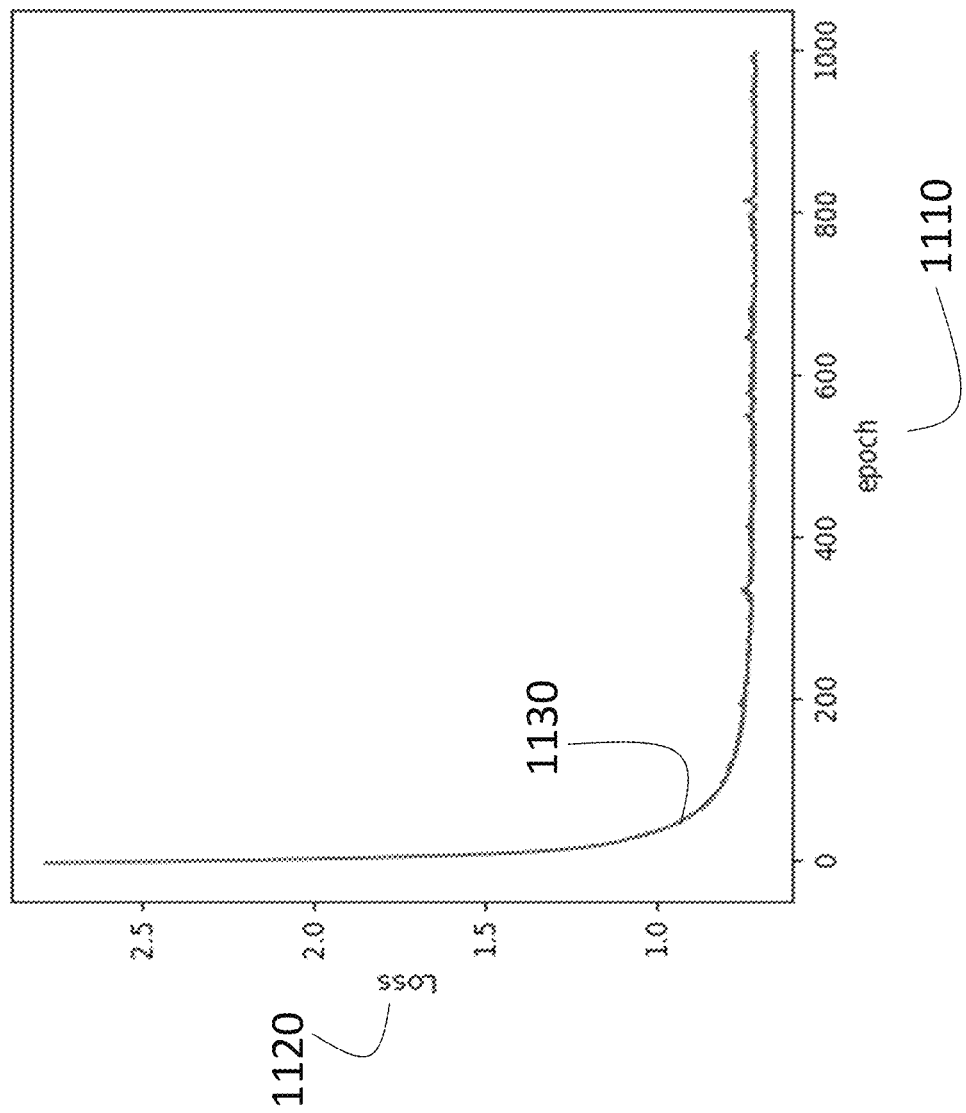
FIG. 11 illustrates the converge process of loss function for training using a small set of PD signals, according to embodiments of the present invention.

FIG. 11 illustrates the converge process of loss function for training using a small set of PD signals under all fault type known. The horizontal axis 1110 and vertical axis 1120 represent the number of epochs, and the value of total loss, and the curve 1130 represents the variation of loss over epoch.

After trained, the feature extractor and fault type classifier can be used to predict PD fault type for new fault event of the second transformer.

The invention claimed is:

1. A system for detecting partial discharge (PD) faults of power transformers in a power distribution network comprising:

a PD signal collection circuit configured to acquire sensor signals measured by sensors arranged in target power transformers, wherein the sensor signals include address data indicative of locations of the transformers;

an input/output (I/O) interface configured to receive the sensor signals from the signal collection circuit;

a memory to store computer-implemented programs including a PD feature extractor, a PD fault type classifier, a PD domain discrepancy discriminator, and a power transformer isolation and maintenance procedure; and a processor configured to perform instructions of the computer-implemented programs using the sensor signals, wherein steps of the instructions comprise:

extracting, for each of the target power transformers, signal features from the sensor signals by using the PD feature extractor;

identify, if the extracted signal features corresponding to an online transformer among the target power transformers indicate a fault type of the online transformer by using the PD fault classifier trained along with the PD feature extractor and the PD domain discrepancy discriminator to determine PD fault types of the online transformer;

generating and transmitting a power transformer isolation signal, if the sensor signal of the online transformer is greater than a defective threshold and a fault type is identified, to a set of switches relevant to the online transformer to disconnect the online transformer from service, wherein the relevant switches include switches to isolate the online transformer and re-route power supply of customers connected to the online transformer.

2. The system of claim 1, wherein the system further comprises the sensors configured to measure the sensor signals including applied voltages and partial discharge voltages for the online transformers.

3. The system of claim 1, wherein the types of the faults are classified into one of floating electrode, metal protrusion, metal particles on surface of insulator, metal protrusion into insulator, and surface discharge.

4. The system of claim 1, wherein the transmitting, the transformer isolation and maintenance procedure is performed based on the address data of the sensor signals of the online transformer.

5. The system of claim 1, wherein the sensor signals are denoised by using discrete wavelet transform technique, wherein multiple moments of statistical distribution are generated for the power transformers based on the denoised sensor signals after normalization by using a sliding window algorithm.

6. The system of claim 5, wherein each PD event is represented by a series of statistics based moments for a set of overlapped time blocks; wherein statistics based moments include an average value of applied voltage for representing an applied voltage magnitude and fault event occurring moment for each time block, and mean, standard deviation, Kurtosis, and Skewness of partial discharge voltages for representing variations of partial discharges within each time block.

7. The system of claim 1, wherein the PD feature extractor, the PD fault classifier, and the PD domain discrepancy discriminator are trained based on a transfer learning-based method using labeled fault events collected from a first transformer, and unlabeled fault events collected from a second transformer, wherein configuration of fault classifier and loss functions for optimizing parameters of feature extractor, fault classifier and domain discriminator are defined differently according to an existence of non-pre-defined fault types in the second transformer; wherein the second transformer is one of the target power transformers.

8. The system of claim 7, wherein the feature extractor is configured as an multi-layer network using 1-dimensional convolution unit, rectified linear unit and residual blocks to extract representative features with dimensions of $D \times 1$ from normalized denoised signals with dimensions $W \times NF$ for each fault event, a fault type classifier configured as an multi-layer network using linear transformer, dropout unit and Softmax function unit to determine probability for fault type belong to predefined fault types with dimension of C based on the representative features with dimensions of $D \times 1$, and domain discriminator configured as an multi-layer network using liner transformer, rectified linear unit, dropout unit, and a sigmoid function unit to determine probability of fault event belonging to first transformer based on of the representative features with dimensions of $D \times 1$, when the fault types in the second transformer are included in the predefined fault types of the first transformer; where W, NF, D, and C denote a number of time blocks, a number of statistics based features, a number of extracted representative features, and a number of predefined fault types.

9. The system of claim 8, wherein the parameters of PD feature extractor, PD fault type classifier and PD domain discrepancy discriminator, $\theta_F$, $\theta_C$ and $\theta_D$ are optimized by iteratively solving a saddle point $(\hat{\theta}_F, \hat{\theta}_C, \hat{\theta}_D)$ using following equations, $$(\hat{\theta}_F, \hat{\theta}_C) = \arg\min_{\theta_F, \theta_C} \left[ L_F(\theta_F) + \lambda_{C1} L_{C1}(\theta_F, \theta_C) + \lambda_D L_D(\theta_F, \hat{\theta}_D) \right], \text{ and}$$

$$(\hat{\theta}_D) = \arg\min_{\theta_D} \left[ L_F(\hat{\theta}_F) + \lambda_{C1} L_{C1}(\hat{\theta}_F, \hat{\theta}_C) - \lambda_D L_D(\hat{\theta}_F, \theta_D) \right],$$

wherein $L_F(\theta_F)$, $L_{C1}(\theta_F, \theta_C)$ and $L_D(\theta_F, \theta_D)$ are a feature loss, a classifier loss and a domain discriminator loss, $\lambda_{C1}$ and $\lambda_D$ are weighting factors for the classifier loss and discriminator loss respectively.

10. The system of claim 9, wherein the feature loss $L_F(\theta_F)$ is defined as a weighted sum of cosine similarity distance loss $CSD(F_1, F_2)$, batch-based instance separation loss $BIS(F_1, F_2)$, and batch-based feature decorrelation loss, $L_F(\theta_F) = w_{CSD} CSD(F_1, F_2) + w_{BIS} BIS(F_1, F_2) + w_{BFD} BFD(G_1, G_2)$, wherein $w_{CSD}$, $w_{BIS}$ and $w_{BFD}$ are the corresponding weights for cosine similarity distance loss, batch-based instance separation loss, and batch-based feature decorrelation loss, respectively; wherein $$CSD(F_1, F_2) = 1.0 - \frac{1}{B^2} \sum_{i=1}^{B} \sum_{j=1}^{B} \frac{F_{1i} \cdot F_{2j}}{\|F_{1i}\|_2 \|F_{2j}\|_2},$$

wherein B denotes the batch size, $F_{1i}$ and $F_{2i}$ denote an i-th feature vector extracted at the outputs of feature extractor for the first and second transformer, D denotes the size of representative features; wherein, the batch-based instance separation loss is defined as $$BIS(F_1, F_2) = -\frac{1}{2 \times B \times D} \sum_{i=1}^{B} \log \left( \frac{\exp\left(F_{1i}(F_{1i})^T\right)}{\sum_{j=1}^{B} \exp\left(F_{1i}(F_{1j})^T\right)} \right) -$$

-continued $$\frac{1}{2 \times B \times D} \sum_{i=1}^{B} \log \left( \frac{\exp(F_{2i}(F_{2i})^T)}{\sum_{j=1}^{B} \exp(F_{2i}(F_{2j})^T)} \right),$$

the batch-based feature decorrelation loss is defined as $$BFD(G_1) = -\frac{1}{2 \times B \times D} \sum_{i=1}^{D} \log \left( \frac{\exp(G_{1i}(G_{1i})^T)}{\sum_{j=1}^{D} \exp(G_{1i}(G_{1j})^T)} \right) - $$

$$\frac{1}{2 \times B \times D} \sum_{i=1}^{D} \log \left( \frac{\exp(G_2(G_{2i})^T)}{\sum_{j=1}^{D} \exp(G_{2i}(G_{2j})^T)} \right),$$

where $G_{1i}$ and $G_{2i}$ denote transposes of $F_{1i}$ and $F_{2i}$.

11. The system of claim 9, wherein the classifier loss $L_{C1}(\theta_F,\theta_C)$ is defined using cross-entropy loss function calculated using the fault events of the first transformer with all fault types predefined, $$L_{C1}(\theta_F, \theta_c) = -\frac{1}{B} \sum_{i=1}^{B} \sum_{c=1}^{C} (y_{1ic} \log p_{1ic}),$$

wherein $y_{1ic}$ is the indicator for a truth fault type of the i-th fault event from the first transformer, $p_{1ic}$ is a predicted probability for fault event belonging to fault type c generated by the fault classifier, C is a total number of predefined fault types; wherein the domain discriminator loss $L_D(\theta_F, \theta_D)$ is defined as a binary cross entropy function with logits loss, $$L_D(\theta_F, \theta_D) = -\frac{1}{B} \sum_{i=1}^{B} (z_{D1i} \log p_{D1i} + (1 - z_{D1i}) \log (1 - p_{D1i})) - $$

$$\frac{1}{B} \sum_{i=1}^{B} (z_{D2i} \log p_{D2i} + (1 - z_{D2i}) \log (1 - p_{D2i})),$$

wherein $p_{D1i}$ and $p_{D2i}$ are probability outputs of domain discrepancy discriminator that ranges from [0,1] for indicating the i-th event belonging to the first transformer and the second transformer, $z_{D1i}$ and $z_{D2i}$ are the indication for ground truth data source for the transformer.

12. The system of claim 7, wherein the PD feature extractor is configured as an multi-layer network using 1-dimensional convolution unit, rectified linear unit and residual blocks to extract representative features with dimensions of D×1 from normalized denoised signals with dimensions of W×NF for each fault event, the PD fault type classifier configured as an multi-layer network using linear transformer, dropout unit and Softmax function unit to determine probability for fault type belong to predefined fault types with dimension of (C+1) based on the representative features with dimensions of D×1, and the PD domain discrepancy discriminator configured as an multi-layer network using liner transformer, rectified linear unit, dropout unit, and a sigmoid function unit to determine probability of fault event belonging to first transformer based on of the representative features with dimensions of D×1, when some of the fault types in the second transformer are not included in the predefined fault types of the first transformer; where W, NF, D and C denote a number of time blocks, a number of statistics based features, a number of extracted representative features, and a number of predefined fault types.

13. The system claim 12, wherein the parameters of PD feature extractor, PD fault type classifier and PD domain discrepancy discriminator, $\theta_F$, $\theta_C$ and $\theta_D$ are optimized by iteratively solving a saddle point $(\hat{\theta}_F,\hat{\theta}_C,\hat{\theta}_D)$ using following equations, $$(\hat{\theta}_F) = \arg \min_{\theta_F} [L_F(\theta_F) + \lambda_{C1} L_{C1}(\theta_F, \hat{\theta}_C) - \lambda_{C2} L_{C2}(\theta_F, \hat{\theta}_C) + $$
$$\lambda_D L_D(\theta_F, \hat{\theta}_D)],$$

$$(\hat{\theta}_C) = \arg \min_{\theta_C} [L_F(\hat{\theta}_F) + \lambda_{C1} L_{C1}(\hat{\theta}_F, \theta_C) + \lambda_{C2} L_{C2}(\hat{\theta}_F, \theta_C) + $$
$$\lambda_D L_D(\hat{\theta}_F, \hat{\theta}_D)],$$

$$(\hat{\theta}_D) = \arg \min_{\theta_D} [L_F(\hat{\theta}_F) + \lambda_{C1} L_{C1}(\hat{\theta}_F, \hat{\theta}_c) + \lambda_{C2} L_{C2}(\hat{\theta}_F, \hat{\theta}_C) - $$
$$\lambda_D L_D(\hat{\theta}_F, \theta_D)],$$

wherein $L_F(\theta_F)$, $L_{C1}(\theta_F,\theta_C)$, $L_{C2}(\theta_F,\theta_C)$ and $L_D(\theta_F,\theta_D)$ are a feature loss, the classifier loss for predefined fault types, the classifier loss for non-predefined fault types and a domain discrepancy discriminator loss, $\lambda_{C1}$, $\lambda_{C2}$ and $\lambda_D$ are weighting factors for classifier loss for predefined fault types, classifier loss for non-predefined fault types, and discriminator loss respectively.

14. The system claim 13, wherein the classifier loss for predefined fault types $L_{C1}(\theta_F,\theta_C)$ is defined using cross entropy loss function, $$L_{C1}(\theta_F, \theta_C) = -\frac{1}{B} \sum_{i=1}^{B} \sum_{c=1}^{C+1} (y_{1ic} \log p_{1ic}),$$

wherein $y_{1ic}$ is the indicator for a truth fault type of the i-th fault event from the first transformer, $p_{1ic}$ is a predicted probability for fault event belonging to fault type c generated by the fault classifier, fault type (1~C) denotes one of pre-defined fault types, and fault type (C+1) denotes a non-predefined fault type; wherein the classifier loss for non-predefined fault types $L_{C2}(\theta_F,\theta_C)$ is defined using binary cross entropy loss with events from the second transformer, $$L_{C2}(\theta_F, \theta_C) = -\frac{1}{2B} \sum_{i=1}^{B} [\log p_{2i(C+1)} + \log (1 - p_{2i(C+1)})],$$

wherein $p_{2i(C+1)}$ is a predicted probability output for i-th fault event from the second transformer that can be classified as non-predefined fault type, i.e. fault type (C+1) by the fault type classifier; wherein B is a batch size.

15. The system of claim 1, wherein if the sensor signal of the online transformer is greater than a replacement threshold and the fault type is identified, the processer generates and transmits a transformer replacement signal to the set of switches connected to the online transformer to isolate the online transformer and replace the online transformer to a replacement transformer.

16. A computer-implemented method for training a partial discharge (PD) diagnosis network for identifying a defect type of a power transformer in a power distribution network, comprising steps of:

generating a concatenated input tensor X from a first power transformer input tensor $X_1$ and a second power transformer input tensor $X_2$, wherein $X=[X_1:X_2]$;

generating extracted representative feature tensors $F=[F_1:F_2]$ by feeding the concatenated tensor X to a feature extractor, where $F_1$ and $F_2$ are outputs of the feature extractor corresponding to inputs $F_1$ and $F_2$ respectively;

computing a feature loss using the extracted representative feature tensors with respect to the first power transformer and the second power transformer;

computing a fault classifier loss $L_C$ by using the outputs of the classifier generated by feeding representative features for the first power transformer and the second power transformer to the classifier;

computing a domain discriminator loss $L_D$ by providing the extracted representative feature tensors F to an adversarial network;

update parameters of the feature extractor, fault classifier and domain discriminator by optimizing combinations of feature loss, classifier loss and domain discriminator loss, wherein the steps of computing the classifier loss, the feature loss, and the domain discriminator loss and corresponding parameter optimizations are continued until a pre-determined accuracy or iteration number is reached.

17. The computer-implemented method of claim 16, wherein the feature loss $L_F$ is defined as a weighted sum of cosine similarity distance loss $CSD(F_1,F_2)$, batch-based instance separation loss $BIS(F_1,F_2)$, and batch-based feature decorrelation loss $BFD(F_1,F_2)$.

18. The computer-implemented method of claim 16, wherein the classifier loss $L_C$ is calculated using a cross entropy loss function for fault events of the first transformer, if the fault types are the same for the first and second transformers.

19. The computer-implemented method of claim 16, wherein the classifier loss $L_C$ divided into two losses if some fault types collected from the second transformer is not present in the first transformer, one is the classifier loss for predefined fault types, $L_{C1}$ calculated using a cross entropy loss function for fault events of the first transformer, and loss for the classifier of non-predefined fault types $L_{C2}$ calculated using binary cross entropy loss with events from the second transformer, and the classifier is to predict fault types with size of (C+1), where C is a number of predefined fault types.

20. The computer-implemented method of claim 16, wherein the input tensors generated based on sensor signals measured by sensors arranged in the first power transformer and the second power transformer represents features of each PD event by using a series of statistics based moments for a set of overlapped time blocks within a duration of each fault event, wherein statistics based moments include an average value of applied voltage for representing an applied voltage magnitude and fault event occurring moment for each time block, and mean, standard deviation, Kurtosis, and Skewness of partial discharge voltages for representing variations of partial discharging within each time block.

21. The computer-implemented method of claim 20, wherein the sensor signals for the first power transformer are electrical measurements that are generated based on simulated PD faults data implemented by an international electrotechnical commission (IEC) 60270 PD detection method, or based on actual fault events collected from an online transformers.

* * * * *